US012038962B2

(12) United States Patent
Barrow et al.

(10) Patent No.: US 12,038,962 B2
(45) Date of Patent: Jul. 16, 2024

(54) SYNTOPICAL READING FOR COLLECTION UNDERSTANDING

(71) Applicant: ADOBE INC., San Jose, CA (US)

(72) Inventors: Joseph Barrow, Greenbelt, MD (US); Rajiv Bhawanji Jain, Falls Church, VA (US); Nedim Lipka, Campbell, CA (US); Vlad Ion Morariu, Potomac, MD (US); Franck Dernoncourt, San Jose, CA (US); Varun Manjunatha, Newton, MA (US)

(73) Assignee: ADOBE INC., San Jose, CA (US)

( * ) Notice: Subject to any disclaimer, the term of this patent is extended or adjusted under 35 U.S.C. 154(b) by 409 days.

(21) Appl. No.: 17/384,136

(22) Filed: Jul. 23, 2021

(65) Prior Publication Data

US 2023/0033114 A1     Feb. 2, 2023

(51) Int. Cl.
    *G06F 16/35*         (2019.01)
    *G06F 40/169*      (2020.01)
    *G06F 40/289*      (2020.01)

(52) U.S. Cl.
    CPC .......... *G06F 16/358* (2019.01); *G06F 40/169* (2020.01); *G06F 40/289* (2020.01)

(58) Field of Classification Search
None
See application file for complete search history.

(56) References Cited

U.S. PATENT DOCUMENTS

| | | | | |
|---|---|---|---|---|
| 2019/0129942 | A1* | 5/2019 | Seuss | G06F 40/56 |
| 2019/0354595 | A1* | 11/2019 | Sabharwal | G06N 3/045 |
| 2020/0334369 | A1* | 10/2020 | Koch | G06N 5/02 |

OTHER PUBLICATIONS

Schlichtkrull, et al., "Modeling relational data with graph convolutional networks", European semantic web conference, pp. 593-607, Springer, arXiv:1703.06103v4, Oct. 26, 2017 (Year: 2017).*
2Ajour, et al., Modeling Frames in Argumentation, In Proceedings of the 2019 Conference on Empirical Methods in Natural Language Processing and the 9th International Joint Conference on Natural Language Processing (EMNLPIJCNLP), 2019, pp. 2922-2932, Hong Kong, China, Association for Computational Linguistics.

(Continued)

*Primary Examiner* — Nicole A K Schmieder
(74) *Attorney, Agent, or Firm* — F. CHAU & ASSOCIATES, LLC

(57) ABSTRACT

Systems and methods for natural language processing are described. One or more embodiments of the present disclosure identify a claim from a document, wherein the claim corresponds to a topic, create a graph comprising a plurality of nodes having a plurality of node types and a plurality of edges having a plurality of edge types, wherein one of the nodes represents the claim, and wherein each of the edges represents a relationship between a corresponding pair of the nodes, encode the claim based on the graph using a graph convolutional network (GCN) to obtain an encoded claim, classify the claim by decoding the encoded claim to obtain a stance label that indicates a stance of the claim towards the topic, and transmit information indicating a viewpoint of the document towards the topic based on the stance label.

18 Claims, 11 Drawing Sheets

(56) References Cited

OTHER PUBLICATIONS

3 Al-Khatib, et al., "End-to-End Argumentation Knowledge Graph Construction", In Proceedings of the Thirty-Fourth AAAI Conference on Artificial Intelligence, 2020, pp. 7367-7374, AAAI.
4 Amigó, et al., "A comparison of Extrinsic Clustering Evaluation Metrics based on Formal Constraints", Information retrieval, 12(4):461-486, 2009.
5 Bar-Haim, et al., "Stance Classification of Context-Dependent Claims", In Proceedings of the 15th Conference of the European Chapter of the Association for Computational Linguistics: vol. 1, Long Papers, pp. 251-261, 2017a., Valencia, Spain, Association for Computational Linguistics.
6 Bar-Haim, et al., "Improving Claim Stance Classification with Lexical Knowledge Expansion and Context Utilization", In Proceedings of the 4th Workshop on Argument Mining, pp. 32-38, 2017b, Copenhagen, Denmark, Association for Computational Linguistics.
7 Bar-Haim, et al., "Quantitative Argument Summarization and Beyond: Cross-Domain Key Point Analysis", In Proceedings of the 2020 Conference on Empirical Methods in Natural Language Processing (EMNLP), pp. 39-49, Online, Association for Computational Linguistics; arXiv preprint arXiv:2010.05369v1 [cs.CL] Oct. 11, 2020.
8 Blei, et al., "Latent Dirichlet Allocation", Journal of Machine Learning Research, 3:993-1022, 2003.
9 Chen, et al., "PerspectroScope: A Window to the World of Diverse Perspectives", In Proceedings of the 57th Annual Meeting of the Association for Computational Linguistics: System Demonstrations, pp. 129-134, Florence, Italy, Association for Computational Linguistics, arXiv preprint arXiv:1906.04761v1 [cs.CL] Jun. 11, 2019.
10 Clauset, et al., "Finding community structure in very large networks", Physical review E, 70(6):066111, arXiv preprint arXiv:cond-mat/0408187v2 [cond-mat.stat-mech] Aug. 30, 2004, 6 pages.
11 Dolan, et al., "Unsupervised Construction of Large Paraphrase Corpora: Exploiting Massively Parallel News Sources", In COLING 2004: Proceedings of the 20th International Conference on Computational Linguistics, pp. 350-356, Geneva, Switzerland, COLING, 2004.
12 Durmus, et al., "Determining Relative Argument Specificity and Stance for Complex Argumentative Structures", In Proceedings of the 57th Annual Meeting of the Association for Computational Linguistics, pp. 4630-4641, Florence, Italy, Association for Computational Linguistics, 2019.
13 Gemechu, et al., "Decompositional Argument Mining: A General Purpose Approach for Argument Graph Construction", In Proceedings of the 57th Annual Meeting of the Association for Computational Linguistics, pp. 516-526, Florence, Italy, Association for Computational Linguistics, 2019.
14 Hasan, et al., "Stance Classification of Ideological Debates: Data, Models, Features, and Constraints", In Proceedings of the Sixth International Joint Conference on Natural Language Processing, pp. 1348-1356, Nagoya, Japan, Asian Federation of Natural Language Processing, 2013.
15 Lawrence, et al., "Using Complex Argumentative Interactions to Reconstruct the Argumentative Structure of Large-Scale Debates", In Proceedings of the 4th Workshop on Argument Mining, pp. 108-117, Copenhagen, Denmark, Association for Computational Linguistics, 2017.
16 Li, et al., "Structured Representation Learning for Online Debate Stance Prediction", In Proceedings of the 27th International Conference on Computational Linguistics, pp. 3728-3739, Santa Fe, New Mexico, USA, Association for Computational Linguistics, 2018.
17 Liu, et al., "ROBERTa: A Robustly Optimized BERT Pretraining Approach", arXiv preprint arXiv:1907.11692v1 [cs.CL] Jul. 26, 2019, 13 pages.
18 Misra, et al., "Using Summarization to Discover Argument Facets in Online Ideological Dialog", In Proceedings of the 2015 Conference of the North American Chapter of the Association for Computational Linguistics: Human Language Technologies, pp. 430-440, Denver, Colorado, Association for Computational Linguistics, 2015.
19 Morris, et al., "TextAttack: A Framework for Adversarial Attacks, Data Augmentation, and Adversarial Training in NLP", arXiv preprint arXiv:2005.05904v4 [cs.CL] Oct. 5, 2020, 15 pages.
20 Paszke, et al., "PyTorch: An Imperative Style, High-Performance Deep Learning Library", In H. Wallach, H. Larochelle, A. Beygelzimer, F. d' Alché-Buc, E. Fox, and R. Garnett, editors, Advances in Neural Information Processing Systems 32, pp. 8024-8035, Curran Associates, Inc., arXiv preprint arXiv:1912.01703v1 [cs.LG] Dec. 3, 2019.
21 Peldszus, et al., "Joint prediction in MST-style discourse parsing for argumentation mining", In Proceedings of the 2015 Conference on Empirical Methods in Natural Language Processing, pp. 938-948, Lisbon, Portugal. Association for Computational Linguistics, 2015.
22 Qiu, et al., "A Latent Variable Model for Viewpoint Discovery from Threaded Forum Posts" In Proceedings of the 2013 Conference of the North American Chapter of the Association for Computational Linguistics: Human Language Technologies, pp. 1031-1040, Atlanta, Georgia, Association for Computational Linguistics, 2013.
23 Ranade, et al., "Stance Classification in Online Debates by Recognizing Users' Intentions", In Proceedings of the SIGDIAL 2013 Conference, pp. 61-69, Metz, France, Association for Computational Linguistics, 2013.
24 Reimers, et al., "Sentence-BERT: Sentence Embeddings using Siamese BERT-Networks", In Proceedings of the 2019 Conference on Empirical Methods in Natural Language Processing, Association for Computational Linguistics, 2019a, 11 pages.
25 Reimers, et al., "Classification and Clustering of Arguments with Contextualized Word Embeddings", In Proceedings of the 57th Annual Meeting of the Association for Computational Linguistics, pp. 567-578, Florence, Italy, Association for Computational Linguistics, 2019b.
26 Sawhney, et al., "GPolS: A Contextual Graph-Based Language Model for Analyzing Parliamentary Debates and Political Cohesion", In Proceedings of the 28th International Conference on Computational Linguistics, pp. 4847-4859, Barcelona, Spain (Online), International Committee on Computational Linguistics, 2020.
27 Schiller, et al., "Stance Detection Benchmark: How Robust Is Your Stance Detection?", CoRR, abs/2001.01565, arXiv preprint arXiv:2001.01565v1 [cs.CL] Jan. 6, 2020, 11 pages.
28 Schlichtkrull, et al., "Modeling Relational Data with Graph Convolutional Networks", In European semantic web conference, pp. 593-607, Springer; arXiv preprint arXiv:1703.06103v4 [stat.ML] Oct. 26, 2017, 9 pages.
29 Somasundaran, et al., "Recognizing Stances in Online Debates", In Proceedings of the Joint Conference of the 47th Annual Meeting of the ACL and the 4th International Joint Conference on Natural Language Processing of the AFNLP, pp. 226-234, Suntec, Singapore, Association for Computational Linguistics, 2009.
30 Sridhar, et al., "Joint Models of Disagreement and Stance in Online Debate", In Proceedings of the 53rd Annual Meeting of the Association for Computational Linguistics and the 7th International Joint Conference on Natural Language Processing (vol. 1: Long Papers), pp. 116-125, Beijing, China, Association for Computational Linguistics, 2015.
31 Stab, et al., "Cross-topic Argument Mining from Heterogeneous Sources", In Proceedings of the 2018 Conference on Empirical Methods in Natural Language Processing, pp. 3664-3674, Brussels, Belgium, Association for Computational Linguistics, 2018.
32 Stede, et al., 2018. "Argumentation Mining", No. 40 in Synthesis Lectures on Human Language Technologies. Morgan & Claypool, 2018, 193 pages.
33 Toledo-Ronen, et al., "Expert Stance Graphs for Computational Argumentation", Expert stance graphs for computational argumentation. In Proceedings of the Third Workshop on Argument Mining (ArgMining2016), pp. 119-123, Berlin, Germany, Association for Computational Linguistics, 2016.

(56) References Cited

OTHER PUBLICATIONS

34 Trautmann, "Aspect-Based Argument Mining", In Proceedings of the 7th Workshop on Argument Mining, pp. 41-52, Online, Association for Computational Linguistics, 2020.

35 Wachsmuth, et al., "Building an Argument Search Engine for the Web", In Proceedings of the 4th Workshop on Argument Mining, pp. 49-59, Association for Computational Linguistics, 2017a.

36 Wachsmuth, et al., "PageRank for Argument Relevance", In Proceedings of the 15th Conference of the European Chapter of the Association for Computational Linguistics: vol. 1, Long Papers, pp. 1117-1127, Association for Computational Linguistics, 2017b.

37 Wang, et al., "Deep Graph Library: A Graph-Centric, Highly-Performant Package for Graph Neural Networks", arXiv preprint arXiv:1909.01315v2 [cs.LG] Aug. 25, 2020, 18 pages.

38 Williams, et al., "A Broad-Coverage Challenge Corpus for Sentence Understanding through Inference", In Proceedings of the 2018 Conference of the North American Chapter of the Association for Computational Linguistics: Human Language Technologies, vol. 1 (Long Papers), pp. 1112-1122. Association for Computational Linguistics, 2018.

\* cited by examiner

| Collections / Nuclear Energy / Overview | | |
|---|---|---|
| Aspects | Aspects of Nuclear Energy | |
| Summary | Aspect 1 | |
| All 50 Documents | It's quite dangerous, but thanks to obviousness of the danger, precautions are taken | |
| | ⚙ Formed Consensus | |
| | ▦ High Coverage | |
| | Associated Terms | |
| | nuclear waste world future production year united_states japan global_warming areas gas investment transport emissions similar left required surrounding argument released proliferation standards close tons grid contribution roughly sites station plans | |
| | Most Settled Claims • For now, I don't think it's a good idea because it can be dangerous and because it produces a lot of dangerous waste. • Nuclear waste disposal is costly Digging massive holes in mountains, transporting nuclear waste to these designated waste areas, and monitoring the waste areas for radiation leakages are all significant costs associated with nuclear energy. Most Contentious Claims • There are no operating "next generation" reactors, such as high-temperature breeder reactors and particle-beam activated reactors, that are reported to produce less waste and have reduced safety concerns. • It is a permanent 'dead zone. | |
| | + See Details | |

Collections / Nuclear Energy / Aspects / Aspect 7

The Process of mining and refining uranium hasn't been a clean process.

Aspect 1
Aspect 2
Aspect 3
Aspect 4
Aspect 5
Aspect 6
Aspect 7
Aspect 8
Aspect 9
Aspect 10

Pro Claims

- I'll bet this functionality will be beneficial even at serval times background radiation.
- Radiation is like virtually all other agents, both chemical and physical, to which life has been exposed during the 3 billion or so years of life on earth.
- Finally, we consider ourselves fortunate to be in the company of many of the aforementioned nuclear engineers and scientists and biological hormesis researchers who have also been accelerating their attempts to reach the public with the truth about nuclear energy and radiation, in order to educate and mitigate the public's phobic response, and to combat the anti-nuclear disinformation campaign.

Con Claims

- To do this we need to...make a dramatic and rapid retreat from the use of nuclear power to generate electricity.
- Replacing coal to limit global warming should not be based on another toxic product.
- [T]he nuclear industry and those that purport to regulate it have down played the potential of such an accident.
- Uranium miners experience higher rates of lung cancer, tuberculosis and other respiratory diseases.
- Yet many of the articles that describe their lives still, out of oxymoronic habit, use scare phrases like "toxic wasteland," "most highly contaminated on earth," and so on.

SYNTOPICAL READING FOR COLLECTION UNDERSTANDING

BACKGROUND

The following relates generally to natural language processing, and more specifically to document analysis using machine learning techniques.

Natural language processing (NLP) refers to techniques for using computers to interpret or generate natural language. In some cases, NLP tasks involve assigning annotation data such as grammatical information to words or phrases within a natural language expression. Different classes of machine-learning algorithms have been applied to NLP tasks. Some algorithms, such as decision trees, utilize hard if-then rules. Other systems use neural networks or statistical models which make soft, probabilistic decisions based on attaching real-valued weights to input features.

Document analysis refers to the task of evaluating aspects of a document using NLP. Document analysis can include subtasks such as aspect detection (i.e., detecting which statements in a document relate to facets of a topic) and stance detection (i.e., detecting a sentiment or position of a document related to an aspect).

However, conventional NLP systems are unable to identify the overall viewpoint of a document with respect to a topic. Evaluating documents to identify a viewpoint can be costly and time consuming. Therefore, there is a need in the art for a viewpoint detection system that identify a viewpoint of a document or collection of documents.

SUMMARY

The present disclosure describes systems and methods for natural language processing. Some embodiments of the disclosure include a viewpoint detection apparatus configured to encode one or more claims based on a syntopical graph using a graph convolutional network (GCN), classify the one or more claims to obtain corresponding stance labels, and subsequently transmit information indicating a viewpoint of a document towards a given topic based on the stance labels. The syntopical graph is used as input to encode the claims (rather than an output of the process) so that the relationships between the claims are encoded into the claim or node representations. In some examples, a machine learning model (i.e., a viewpoint detection network of the apparatus) may be trained to predict a stance label for each of the claims using a classification loss function.

A method, apparatus, and non-transitory computer readable medium for natural language processing are described. One or more embodiments of the method, apparatus, and non-transitory computer readable medium include identifying a claim from a document, wherein the claim corresponds to a topic, creating a graph comprising a plurality of nodes having a plurality of node types and a plurality of edges having a plurality of edge types, wherein one of the nodes represents the claim, and wherein each of the edges represents a relationship between a corresponding pair of the nodes, encoding the claim based on the graph using a graph convolutional network (GCN) to obtain an encoded claim, classifying the claim by decoding the encoded claim to obtain a stance label that indicates a stance of the claim towards the topic, and transmitting information indicating a viewpoint of the document towards the topic based on the stance label.

An apparatus and method for natural language processing are described. One or more embodiments of the apparatus and method include a claim extraction network configured to identify a claim from a document, wherein the claim corresponds to a topic, a relationship identifier configured to create a graph comprising a plurality of nodes and a plurality of edges, wherein the nodes include the claim, and wherein each of the edges represents a relationship between a corresponding pair of the nodes, a stance detection network configured to classify the claim based on the graph to obtain a stance label that indicates a stance of the claim towards the topic, wherein the stance detection network comprises a graph convolutional network (GCN), and an aspect detection component configured to cluster the nodes based on the graph to obtain an aspect phrase of the topic, wherein a viewpoint includes the aspect phrase.

A method, apparatus, and non-transitory computer readable medium for training a network are described. One or more embodiments of the method, apparatus, and non-transitory computer readable medium include identifying a document comprising a claim and a ground-truth stance label for the claim, wherein the claim corresponds to a topic, creating a graph comprising a plurality of nodes and a plurality of edges, wherein the nodes include the claim, and wherein each of the edges represents a relationship between a corresponding pair of the nodes, predicting a stance label for the claim based on the graph using a stance detection network comprising a graph convolutional network (GCN), computing a classification loss function by comparing the ground-truth stance label and the predicted stance label, and training the stance detection network based on the classification loss function.

BRIEF DESCRIPTION OF THE DRAWINGS

FIG. 4 shows an example of a user interface of a viewpoint detection system according to aspects of the present disclosure.

FIG. 5 shows an example of a user interface indicating a stance label for each of claims according to aspects of the present disclosure.

DETAILED DESCRIPTION

Figure 1:
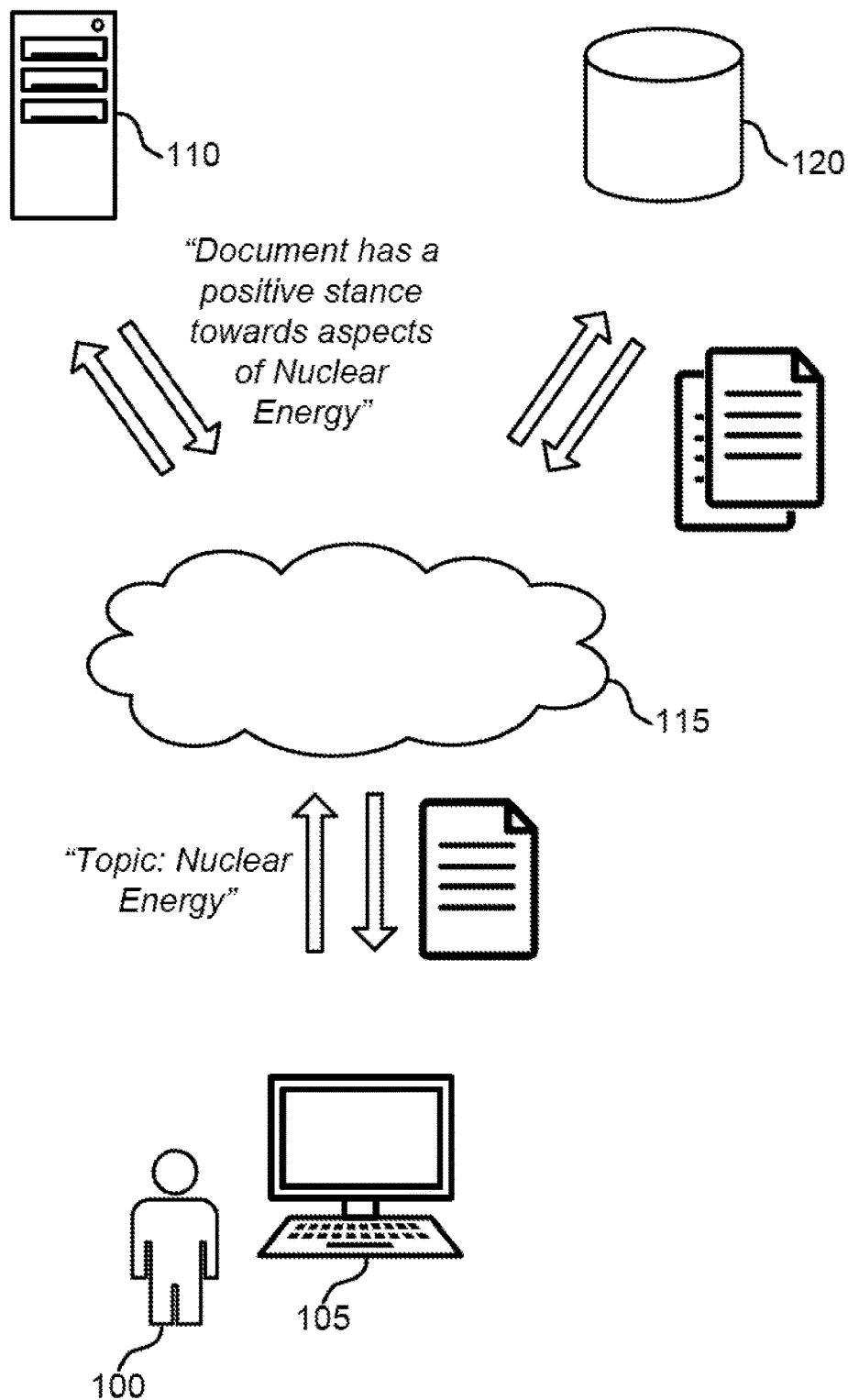
FIG. 1 shows an example of a viewpoint detection system according to aspects of the present disclosure.

The present disclosure describes systems and methods for natural language processing. Some embodiments of the disclosure include a viewpoint detection apparatus configured to encode one or more claims based on a syntopical graph using a graph convolutional network (GCN), classify the one or more claims to obtain corresponding stance labels, and subsequently transmit information indicating a viewpoint of a document towards a given topic based on the stance labels. The syntopical graph is used as input to encode the claims (rather than an output of the process) so that the relationships between the claims are encoded into the claim or node representations. In some examples, a machine learning model (i.e., a viewpoint detection network of the apparatus) may be trained to predict a stance label for each of the claims using a classification loss function.

Users are often interested in gaining a global understanding of a collection of text related to a certain topic, especially when the collection of text is large. Recently, machine learning models such as deep convolutional neural networks (CNNs) have been used for summarization of documents. For example, an abstract summarization system may be trained to generate an abstract based on the set of documents as input. In some cases, a stance toward a topic covered in a document is identified using content-oriented features or patterns in a dialogic structure. However, conventional NLP systems do not model relationships between claims in a collection, and are therefore unable to detect a viewpoint of a document related to a topic.

A viewpoint of a document conveys a stance of the document towards an aspect of a topic. The viewpoint is expressed through statements or claims from one or more documents. An aspect of a document is a concept related to a topic that can be identified with statements in a document. In some examples, an aspect refers to a more focused facet of a topic (i.e., a sub-topic). Some documents have multiple conclusions which can be grouped based on relating to a same aspect of the topic discussed. For example, two statements from a document may include "nuclear energy emits zero $CO_2$," and "nuclear can provide a clean baseload, eliminating the need for fracking and coal mining". Here, the statements may be grouped as relating to the aspect: "the environmental impact of nuclear energy." In some examples, aspects may focus on geographical area, time frame, or demographics.

A stance is an attitude or position conveyed in a document towards an aspect of the topic. In some cases, a stance can be based on information or evidence. The overall tone of a document is influenced by the stance of each of the statements in the document. For example, based on the two statements above, it may be concluded that the document containing the statements has a viewpoint that includes a positive stance towards the impact of nuclear energy on environment. That is, the viewpoint includes support for nuclear energy (topic) based on the positive view (stance) of the environmental impact of nuclear energy (aspect).

Embodiments of the present disclosure include a neural network trained to identify a viewpoint of a document or collection of documents. The viewpoint detection apparatus is configured to create a graph having a set of nodes and a set of edges, where claims are represented by nodes and each of the edges represents a relationship between a corresponding pair of the nodes. The nodes and edges have multiple node types and edge types, respectively. The graph is a syntopical multi-type graph, which models relationships between pairs of claims such as entailment, paraphrase, refute, support and specificity relationship. The graph is then input to a GCN which encodes the claims (rather than just an output of the process) so the relationships between the claims are encoded into the claim or node representations.

Some embodiments of the present disclosure include a viewpoint detection apparatus that identifies or extracts a claim corresponding to a topic from a document or collection of documents. The apparatus then creates a graph having a set of nodes and edges, where the edges capture relationships among the claims from the document. Subsequently, the apparatus encodes the claim based on the graph using a GCN. The apparatus classifies the claim by decoding the encoded claim to obtain a stance label. The viewpoint detection apparatus is trained to predict the stance label indicating a stance of the claim towards the topic. In some cases, the apparatus is configured to cluster the nodes based on the graph to obtain an aspect phrase of the topic (e.g., a sub-topic).

Embodiments of the present disclosure may be used in the context of content management. For example, a viewpoint detection system based on the present disclosure may be used to help users gain a global understanding of a collection of documents with respect to a topic. The system can identify claims, find sub-topics (aspects) that each claim discusses, and predict a position of each claim towards the topic (stance). In some cases, the viewpoint detection system can select a representative document from the collection for users to obtain a balanced view of the collection. This is useful when size of a collection of documents is large and studying each of the documents is time-consuming. An example application in the viewpoint detection and examples of user interface are provided with reference to FIGS. 1-6. Details regarding the architecture of an example viewpoint detection apparatus are provided with reference to FIGS. 7-9. An example of a process for training a viewpoint detection network are provided with reference to FIG. 11.

Viewpoint Detection System

FIG. 1 shows an example of a viewpoint detection system according to aspects of the present disclosure. The example shown includes user 100, user device 105, viewpoint detection apparatus 110, cloud 115, and database 120.

In the example of FIG. 1, user 100 may provide a topic. For example, the topic could be "nuclear energy". Viewpoint detection apparatus 110 receives a set of documents from database 120. The set of documents include statements relevant to the topic. The user device 105 transmits the topic to the viewpoint detection apparatus 110, which detects a viewpoint of the documents with respect to the topic, and in some cases, selects a representative document for the user 100.

The user 100 communicates with the viewpoint detection apparatus 110 via the user device 105 and the cloud 115. For example, user 100 is a reader analyzing a large set of documents to obtain an understanding of the collection. User 100 looks for viewpoint of each of the documents towards aspects of the topic. Additionally, user 100 wants to find the representative document that can best summarize the expressed viewpoints. In some examples, the user device 105 communicates with the viewpoint detection apparatus 110 via the cloud 115.

Accordingly, viewpoint detection apparatus 110 identifies a claim from a document so that the claim corresponds to the topic. Viewpoint detection apparatus 110 creates a graph including a set of nodes and a set of edges. One of the nodes represents the claim, and each of the edges represents a relationship between a corresponding pair of the nodes. In some examples, the nodes have one or more node types, and the edges have one or more edge types. The graph generated may be referred to as a "syntopical graph", which is described in further detail with reference to FIG. 8. Viewpoint detection apparatus 110 encodes the claim based on the graph using a graph convolutional network (GCN) to obtain an encoded claim.

Then, viewpoint detection apparatus 110 classifies the claim by decoding the encoded claim to obtain a stance label that indicates a stance of the claim towards the topic. Additionally, viewpoint detection apparatus 110 generates a viewpoint of the document with respect to a topic and transmits information indicating the viewpoint based on the stance label. Formally, viewpoint can be expressed via triple V=(topic, aspect, stance).

Informally, a viewpoint enables a reader to obtain a thorough understanding of the topic. For example, a document may have a positive stance towards nuclear energy, based on an example aspect regarding whether nuclear energy production is a clean process (e.g., environmental impact of nuclear energy). Further detail regarding the process of generating a viewpoint is described with reference to FIG. 10.

A user interface may enable a user 100 to interact with a device. In some embodiments, the user interface may include an audio device, such as an external speaker system, an external display device such as a display screen, or an input device (e.g., remote control device interfaced with the user interface 105 directly or through an IO controller module). In some cases, a user interface 105 may be a graphical user interface (GUI).

The user device 105 may be a personal computer, laptop computer, mainframe computer, palmtop computer, personal assistant, mobile device, or any other suitable processing apparatus. In some examples, the user device 105 includes software that incorporates a viewpoint detection application. The viewpoint detection application may either include or communicate with the viewpoint detection apparatus.

In some embodiments, user device 105 includes a user interface so that a user 100 can upload text or document via the user interface. A user interface may enable a user to interact with a device. In some embodiments, the user interface may include an audio device, such as an external speaker system, an external display device such as a display screen, or an input device (e.g., remote control device interfaced with the user interface directly or through an IO controller module).

Viewpoint detection apparatus 110 includes a computer implemented network comprising a claim extraction network, a relationship identifier, a stance detection network, and an aspect detection component. The network identifies a claim from a document, wherein the claim corresponds to a topic. The network creates a graph comprising a set of nodes having a set of node types and a set of edges having a set of edge types. One of the nodes represents the claim, while each of the edges represents a relationship between a corresponding pair of the nodes. The network encodes the claim based on the graph using a graph convolutional network (GCN) to obtain an encoded claim. The network classifies the claim by decoding the encoded claim to obtain a stance label that indicates a stance of the claim towards the topic. The network transmits information indicating a viewpoint of the document towards the topic based on the stance label.

Viewpoint detection apparatus 110 may also include a processor unit, a memory unit, and a training component. Additionally, viewpoint detection apparatus 110 can communicate with the database 120 via the cloud 115. In some cases, the architecture of the viewpoint detection network is also referred to as a network model or a network. Further detail regarding the architecture of viewpoint detection apparatus 110 is provided with reference to FIGS. 7-9. Further detail regarding a process for viewpoint detection is provided with reference to FIG. 10. Further detail regarding the training of viewpoint detection apparatus 110 is provided with reference to FIG. 11.

In some cases, viewpoint detection apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

A cloud 115 is a computer network configured to provide on-demand availability of computer system resources, such as data storage and computing power. In some examples, the cloud 115 provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, a cloud 115 is limited to a single organization. In other examples, the cloud 115 is available to many organizations. In one example, a cloud 115 includes a multi-layer communications network comprising multiple edge routers and core routers. In another example, a cloud 115 is based on a local collection of switches in a single physical location.

A database 120 is an organized collection of data (e.g., documents). For example, a database 120 stores documents in a specified format known as a schema. A database 120 may be structured as a single database, a distributed database, multiple distributed databases, or an emergency backup database. In some cases, a database controller may manage data storage and processing in a database 120. In some cases, a user interacts with database controller. In other cases, database 120 controller may operate automatically without user interaction.

Figure 2:
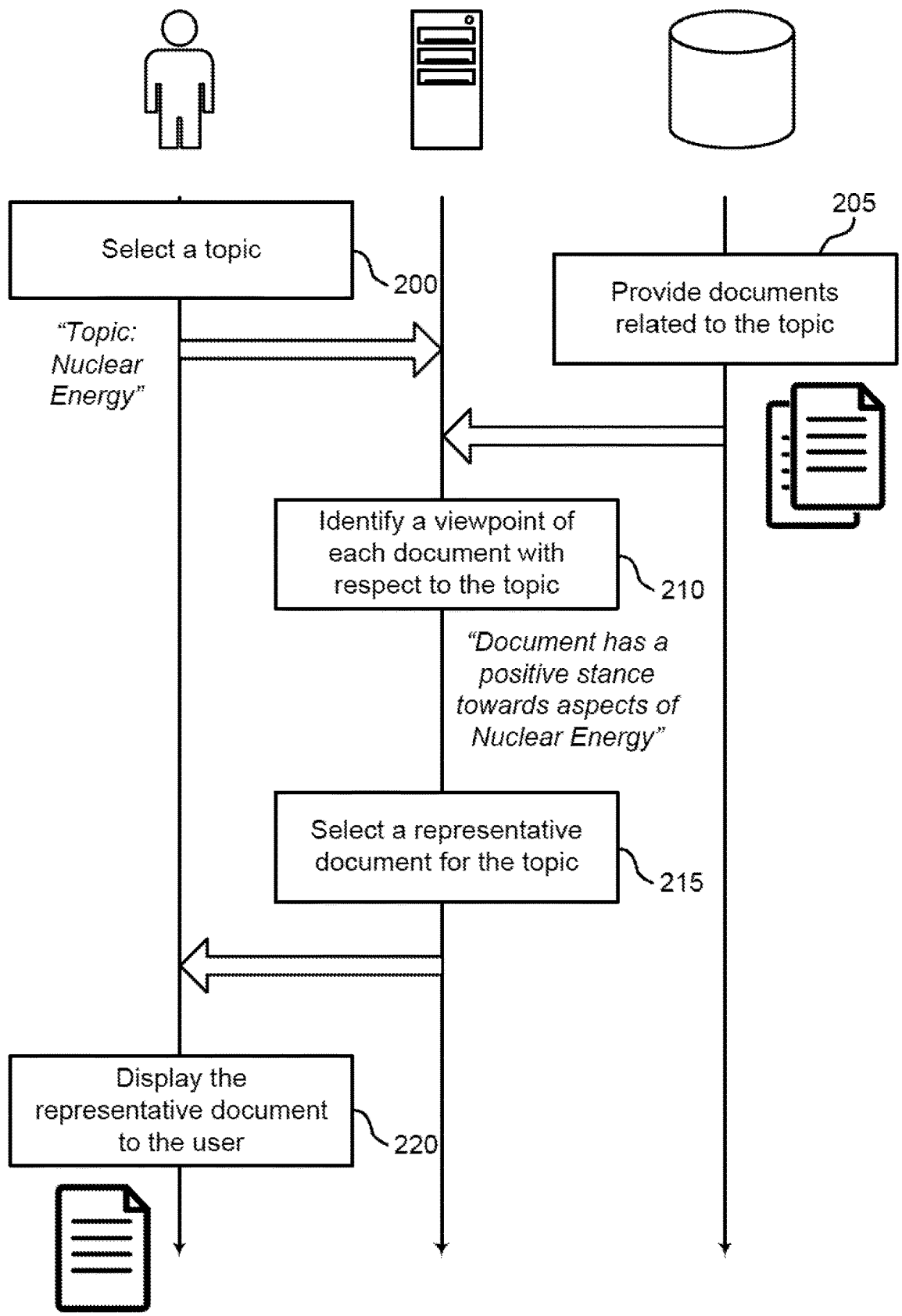
FIG. 2 shows an example of a process for viewpoint detection according to aspects of the present disclosure.

FIG. 2 shows an example of a process for viewpoint detection according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 200, a user selects a topic. As the example illustrated in FIG. 1, the topic is nuclear energy. The user (e.g., reader, researcher) hopes to make sense of a document or a collection of documents for the given topic. In some cases, the operations of this step refer to, or may be performed by, a user as described with reference to FIG. 1.

At operation 205, the system retrieves documents related to the topic from database. In some cases, the operations of this step refer to, or may be performed by, a database as described with reference to FIG. 1. The documents are a collection of text referring to the same topic (e.g., nuclear energy). In some examples, the documents include news articles, journal articles, research reports, or a combination thereof that may include a variety of viewpoints. In some examples, a pair of documents from the collection have same or different viewpoints with respect to the topic. In some cases, readers gain an understanding of a topic involving multiple viewpoints by applying dialectics to collection browsing. The process may be referred to as syntopical reading (i.e., understanding a core concept by reading a collection of works). Syntopical reading depends on locating passages on the core concept that agree or disagree with each other, defining the issues, and analyzing the discussion to gain a better understanding of the core concept.

At operation 210, the system identifies a viewpoint of each document with respect to the topic. In some examples, each of the documents include claims or statements. These claims or statements may be grouped by aspects of the topic discussed and/or grouped by stance they convey towards the topic. A viewpoint is expressed based on the topic, an aspect, and stance. The viewpoint of the document may be expressed through multiple claims. As a simple example for illustrative purpose, consider claims from a document related to the topic, "nuclear energy emits zero $CO_2$" and "nuclear can provide a clean baseload, eliminating the need for fracking and coal mining".

The system can identify the viewpoint of the document towards the topic based on the stance associated with each of the claims. In this example, the viewpoint of the document is in support of the aspect (i.e., environmental impact). In some cases, the operations of this step refer to, or may be performed by, a viewpoint detection apparatus as described with reference to FIG. 1. Further description of the process by which the system identifies a viewpoint of each document is provided with reference to FIG. 10.

At operation 215, the system selects a representative document for the topic. The representative document may be selected that best summarizes the key aspects in the collection and can provide users with a balanced viewpoint of the key arguments in the collection. For example, the representative document may include a high percentage of aspects related to a topic, or that provides a balanced viewpoint toward a wide number of aspects related to a topic. In some cases, the operations of this step refer to, or may be performed by, a viewpoint detection apparatus as described with reference to FIG. 1.

At operation 220, the system displays the representative document to the user. The user can obtain an understanding of the collection of documents by studying the representative document. The representative document enables the user to save time in getting through the collection while the user has a good understanding the collection. In some cases, the operations of this step refer to, or may be performed by, a user device as described with reference to FIG. 1.

Figure 3:
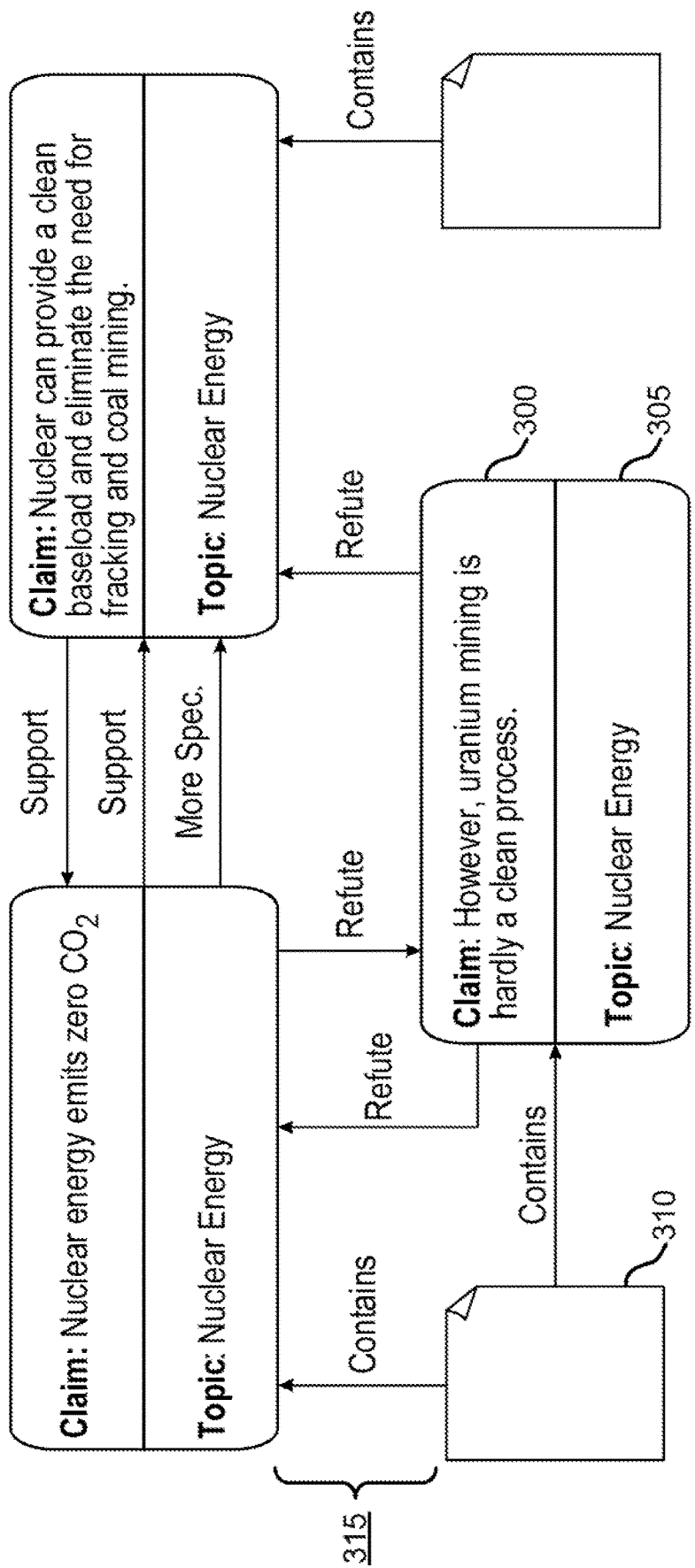
FIG. 3 shows an example of a syntopical graph based on a set of documents and a topic according to aspects of the present disclosure.

FIG. 3 shows an example of a syntopical graph based on a set of documents 310 and a topic 305 according to aspects of the present disclosure. The example shown includes claim 300, topic 305, document 310, and relationship 315.

As an example illustrated in FIG. 3, a syntopical graph is created based on a collection of documents relevant to the topic of nuclear energy. However, the topic is not limited to nuclear energy. The nodes are documents and claims, and there are weighted and typed edges between any one pair of nodes. In some downstream applications, representation of the topic may be added to the claim nodes.

Claim 300 is an example of, or includes aspects of, the corresponding element described with reference to FIGS. 5 and 8. In the example, a first claim 300 is "nuclear energy emits zero $CO_2$. A second claim 300 is "nuclear can provide a clean baseload and eliminate the need for fracking and coal mining." A third claim 300 is "however, uranium mining is hardly a clean process." The first claim, second claim, and third claim relate to topic 305, which is "nuclear energy". Topic 305 is an example of, or includes aspects of, the corresponding element described with reference to FIGS. 5 and 8.

In an embodiment, a claim node is one node type in a syntopical graph. A claim node represents a topically relevant claim in a collection of documents. A claim may be treated as a node embedded in a graph. Additionally, graph structures are used to represent the context in which the claim occurs, such as the document the claim appears in or the claim's relationship with other claims.

In some examples, if claim (a) refutes claim (b), and claim (b) has a positive stance to a topic, claim (a) is considered to have a negative stance. The relationships between the claims may be represented by a syntopical graph with multiple edges between the nodes. In some cases, claims can have edges that label relative agreement and relative specificity.

In an embodiment, documents can form document nodes. Two claims from the same source are more likely to represent the same viewpoint than a pair of randomly sampled claims. Claims from the same source share information with each other via document nodes, which enables a viewpoint detection apparatus to pool information about groups of claims and share the information among them. Similar information about claims can be aggregated in the metadata node and broadcast to all the claims. In the example illustrated in FIG. 3, a document 310 contains at least two claims or claim nodes.

As an example, the document 310 contains the first claim 300 "nuclear energy emits zero $CO_2$" and the third claim 300 "however, uranium mining is hardly a clean process." The first claim and the third claim both relate to the topic "nuclear energy". The first claim refutes the third claim (i.e., a refute relationship exists between this pair of claims represented by the "refute" edge type) because the first claim supports nuclear energy while the third claim states uranium mining is not a clean process. Document 310 is an example of, or includes aspects of, the corresponding element described with reference to FIG. 8.

In some embodiments of the present disclosure, a syntopical graph models pairwise textual relationships between claims to enable reconstruction of the latent viewpoints in a collection (e.g., a set of documents). The syntopical graph makes the points of agreement and disagreement within the collection explicit. In some examples, the syntopical graph denotes a multi-graph (i.e., a pair of nodes can have multiple typed edges) that indicates whether a claim paraphrases another. The edges of the multi-graph may also represent relationships between claims such as relative stance, relative specificity, etc. Syntopical graphs may be created through transferring pre-trained pairwise models.

FIG. 4 shows an example of a user interface of a viewpoint detection system according to aspects of the present disclosure. The example shown includes user interface 400, aspect phrase 405, consensus level 410, and coverage level 415.

According to some embodiments, user interface 400 is configured to display information indicating the viewpoint, a synopsis, a consensus level 410, a coverage level 415, or any combination thereof. The viewpoint detection apparatus (see FIG. 1) identifies terms in the document associated with the topic based on the graph. Additionally, the viewpoint detection apparatus determines whether the claim is a settled claim, or a contentious claim based on the graph. User interface 400 is configured to list settled claims and/or contentious claims via grouping the claims. For example, user interface 400 identifies most settled claims and most contentious claims by grouping one or more claims.

In an example illustrated in FIG. 4, a user is analyzing websites and editorial about nuclear energy (i.e., the topic) to build a marketing strategy. The viewpoint detection apparatus receives a collection of 50 documents to extract insights. The viewpoint detection apparatus can extract the mains aspects, or the main sub-topics being discussed in the collection. For example, one aspect relates to the technology and waste it produces is dangerous, but can be made safe. The user interface displays "aspect 1— It's quite dangerous, but thanks to obviousness of the danger, precautions are taken." There are one or more aspects. The viewpoint detection apparatus can transmit information indicating a consensus level 410 and a coverage level 415 based on the collection of documents and the topic. In this example, the viewpoint detection apparatus determines that the collection has high coverage, and most articles of the collection are in agreement or consensus with this viewpoint. Accordingly, user interface 400 shows "high coverage" and "formed consensus", respectively.

FIG. 5 shows an example of a user interface indicating a stance label for each of claims according to aspects of the present disclosure. The example shown includes user interface 500, topic 505, claim 510, aspect phrase 515, and stance label 520.

In an example illustrated in FIG. 5, the topic 505 relates to "nuclear energy" shown on the top of the user interface 500. A list of aspects is displayed on the left side of the user interface 500. The example aspect (i.e., a sub-topic) being discussed is whether nuclear energy is clean. The user interface 500, via viewpoint detection apparatus, finds that the collection of documents has a large amount of disagreement with respect this aspect. This aspect (i.e., whether nuclear energy is clean) is also not discussed as often as some other sub-topics or aspects in the collection. Each of these aspects (in some cases, also referred to as sub-topics) include claims or statements found in the collection.

The viewpoint detection apparatus can determine whether each of the claim is in support of or against the aspect ("the process of mining and refining uranium hasn't been a clean process"). For example, the claim is in favor of nuclear energy, but the statement "I'll bet this functionality will be beneficial even at several times background radiation" is controversial. The viewpoint detection apparatus classifies each claim to have a stance label (e.g., pro claims, con claims). Pro claims are in support of the topic or an aspect while con claims are against the topic or the aspect. In this example, pro claims and con claims are evenly distributed as the number of claims on both side are even.

Additionally, a user can understand the stance or position with regards to the topic of each individual document. The user can also know how many of the key aspects or topics each document discusses. For example, one document is very imbalanced against nuclear energy due to the fact that it is an editorial review for the case against nuclear power.

Figure 6:
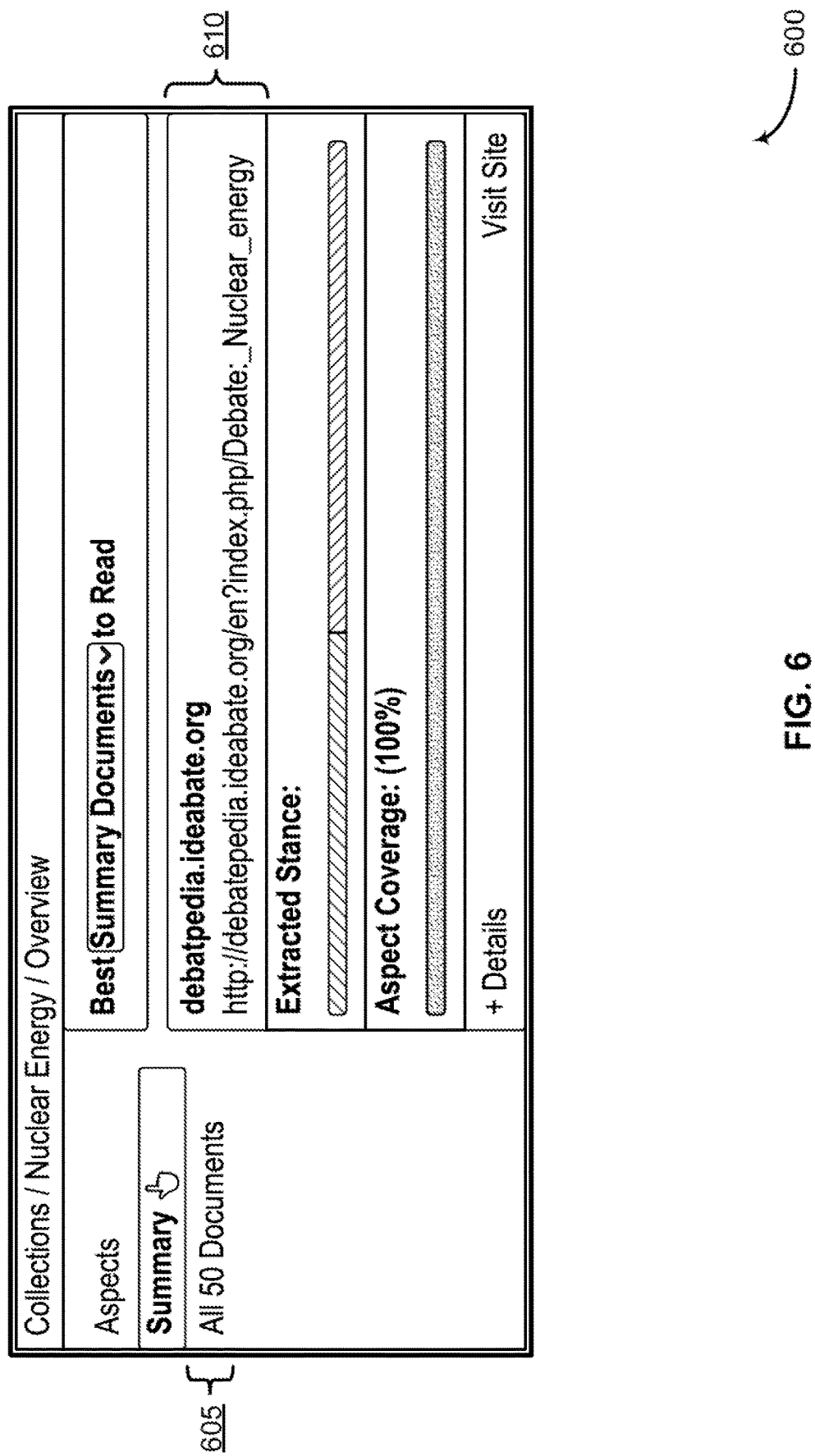
FIG. 6 shows an example of a user interface indicating a representative document according to aspects of the present disclosure.

FIG. 6 shows an example of a user interface indicating a representative document according to aspects of the present disclosure. The example shown includes user interface 600, documents 605, and representative document 610.

The viewpoint detection apparatus can provide insights into which one or more documents that best summarize the key aspects in the collection (e.g., provide users with a balanced viewpoint of the key arguments in the collection of documents). In an example illustrated in FIG. 6, the viewpoint detection apparatus determines that there is one document in this case (labeled as "best summary documents to read"). The viewpoint detection apparatus selects this document as a representative document of the collection based on the viewpoint. In this example, the representative document has aspect coverage of 100%. Furthermore, the user interface 600 shows extracted stance (i.e., position/attitude of a claim with respect to the topic or a sub-topic). In this case, the extracted stance (i.e., support, against) from the representative document is relatively even. In some examples, the extracted stance (i.e., support, against) from the representative document is relatively uneven.

Network Architecture

Figure 7:
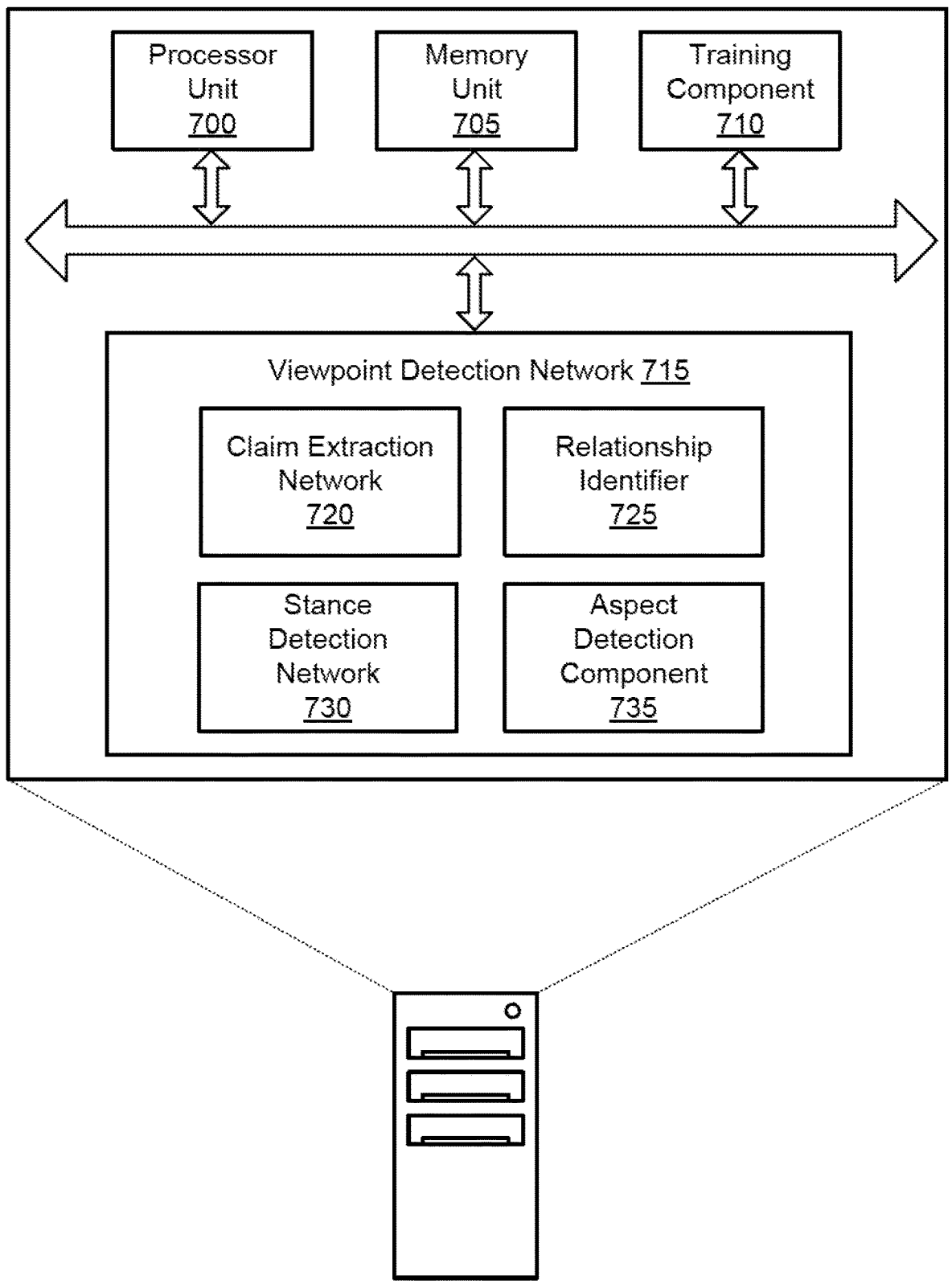
FIG. 7 shows an example of a viewpoint detection system according to aspects of the present disclosure.
Figure 8:
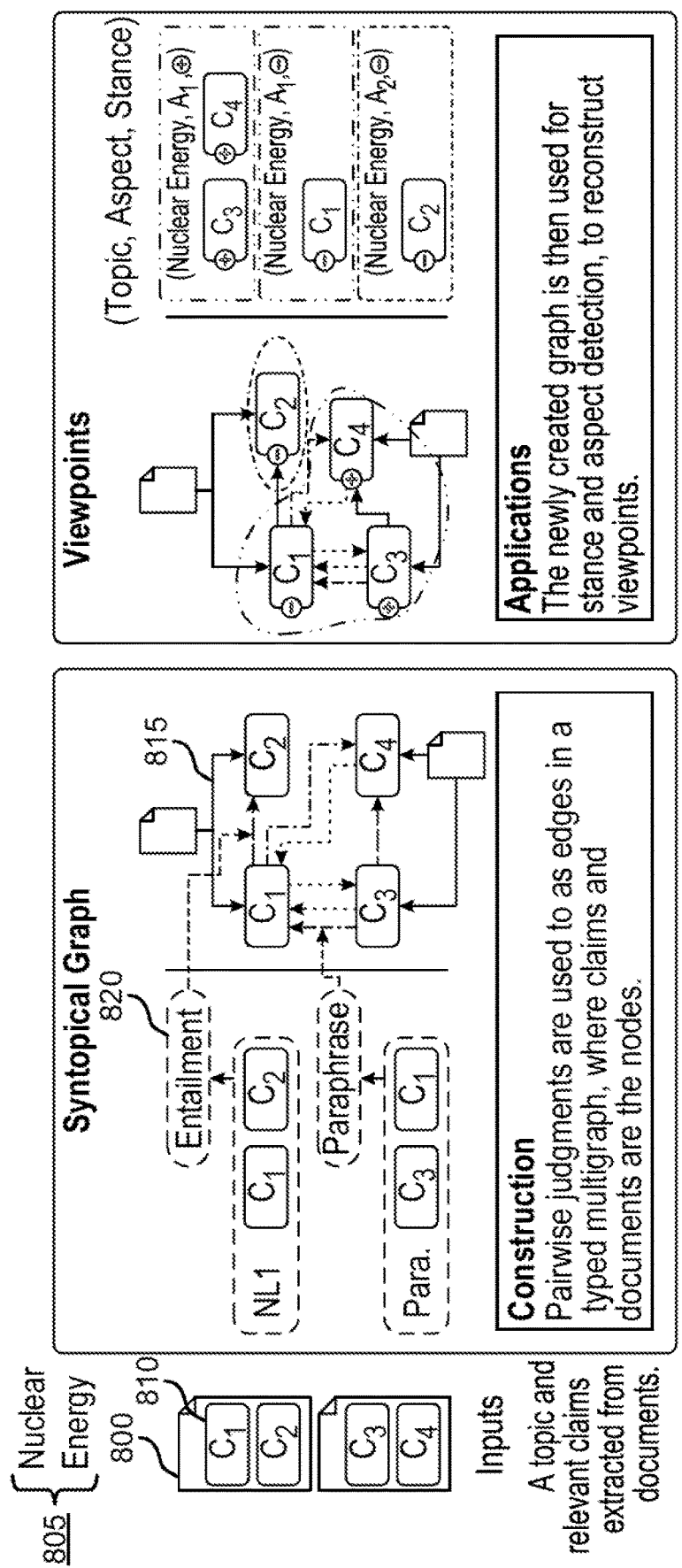
FIG. 8 shows an example of a syntopical graph representing context of a set of claims according to aspects of the present disclosure.
Figure 9:
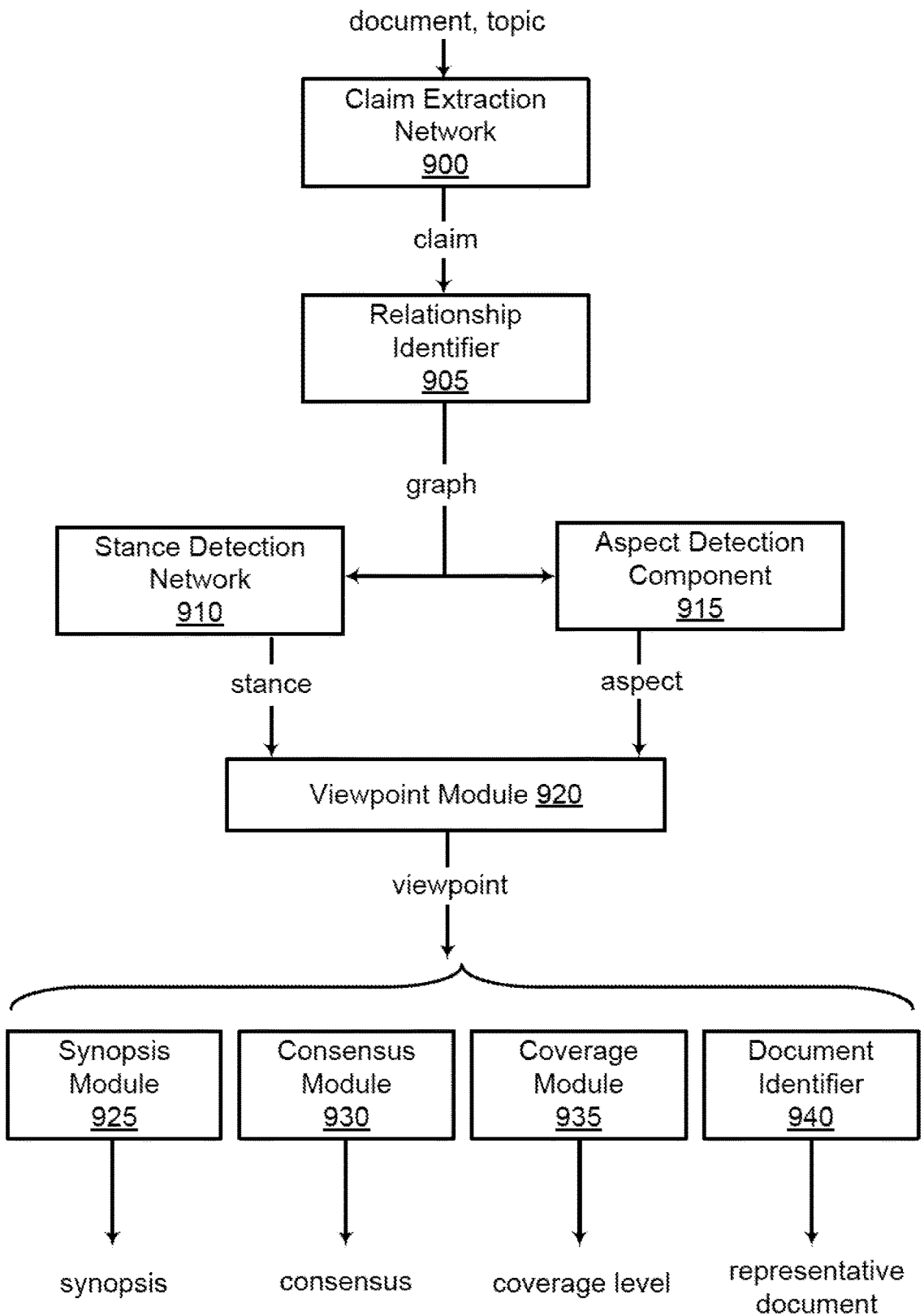
FIG. 9 shows an example of a viewpoint detection diagram according to aspects of the present disclosure.

In FIGS. 7-9, an apparatus and method for natural language processing are described. One or more embodiments of the apparatus and method include a claim extraction network configured to identify a claim from a document, wherein the claim corresponds to a topic, a relationship identifier configured to create a graph comprising a plurality of nodes and a plurality of edges, wherein the nodes include the claim, and wherein each of the edges represents a relationship between a corresponding pair of the nodes, a stance detection network configured to classify the claim based on the graph to obtain a stance label that indicates a stance of the claim towards the topic, wherein the stance detection network comprises a graph convolutional network (GCN), and an aspect detection component configured to cluster the nodes based on the graph to obtain an aspect phrase of the topic, wherein a viewpoint includes the aspect phrase.

Some examples of the apparatus and method further include a viewpoint module configured to generate the viewpoint of the document towards the topic, wherein the viewpoint includes the topic, the stance label, and the aspect phrase. Some examples of the apparatus and method further include a synopsis module configured to generate a synopsis of the document based on the viewpoint.

Some examples of the apparatus and method further include a consensus module configured to indicate a consensus level of a plurality of documents including the document towards the topic based on the viewpoint. Some examples of the apparatus and method further include a coverage module configured to indicate a coverage level of a plurality of documents towards the aspect phrase.

Some examples of the apparatus and method further include a document identifier configured to select the document as a representative document of a plurality of documents based on the viewpoint. Some examples of the apparatus and method further include a user interface configured to display information indicating the viewpoint, a synopsis, a consensus level, a coverage level, or any combination thereof.

FIG. 7 shows an example of a viewpoint detection system according to aspects of the present disclosure. The example shown includes processor unit 700, memory unit 705, training component 710, and viewpoint detection network 715.

In some embodiments, viewpoint detection network 715 include claim extraction network 720, relationship identifier 725, stance detection network 730, and aspect detection component 735. The relationship between these components is described in further detail with reference to FIG. 9.

A processor unit 700 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor unit 700 is configured to operate a memory array using a memory controller. In other cases, a memory controller is integrated into the processor. In some cases, the processor unit 700 is configured to execute computer-readable instructions stored in a memory to perform various functions. In some embodiments, a processor unit 700 includes special purpose components for modem processing, baseband processing, digital signal processing, or transmission processing.

Examples of a memory unit 705 include random access memory (RAM), read-only memory (ROM), or a hard disk. Examples of memory unit 705 include solid state memory and a hard disk drive. In some examples, a memory unit 705 is used to store computer-readable, computer-executable software including instructions that, when executed, cause a processor to perform various functions described herein. In some cases, the memory unit 705 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory unit 705 store information in the form of a logical state.

According to some embodiments of the present disclosure, the viewpoint detection apparatus includes a computer implemented artificial neural network (ANN) that identifies a claim from a document, where the claim corresponds to a topic. The viewpoint detection apparatus obtains a stance label and transmits information indicating a viewpoint of the document towards the topic based on the stance label. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

According to some embodiments of the present disclosure, the viewpoint detection network includes a graph convolution network (GCN). A GCN is a type of neural network that utilizes a convolutional operation on graphs and uses the structural information of the graph to generate an output. A GCN may be used for node classification (e.g., documents) in a graph (e.g., a citation network), where labels are available for a subset of nodes using a semi-supervised learning approach. In one example, a feature description for every node is summarized in a matrix and uses a form of pooling operation to produce a node level output. In some cases, GCNs use dependency trees which enrich representation vectors for aspect terms and search for sentiment polarity of an input phrase/sentence.

According to some embodiments, training component 710 identifies a document including a claim and a ground-truth stance label for the claim, where the claim corresponds to a topic. In some examples, training component 710 computes a classification loss function by comparing the ground-truth stance label and the predicted stance label. Training component 710 trains the stance detection network 730 based on the classification loss function.

According to some embodiments, claim extraction network 720 identifies a claim from a document, where the claim corresponds to a topic. In some examples, claim extraction network 720 embeds text of the document to obtain the claim. In some examples, claim extraction network 720 extracts a set of claims from each of a set of documents, where the nodes include a node corresponding to each of the set of claims. In some examples, the node types include a claim node type and a document node type. In some examples, the edges include an edge between each of the set of claims and a corresponding document from the set of documents. Claim extraction network 720 is an example of, or includes aspects of, the corresponding element described with reference to FIG. 9.

According to some embodiments, the claim extraction network 720 is further configured to generate text embeddings of portions of the document to obtain the claim. In some examples, the claim extraction network 720 includes a pre-trained transformer model (e.g., BERT).

According to some embodiments, relationship identifier 725 creates a graph including a set of nodes having a set of node types and a set of edges having a set of edge types, where one of the nodes represents the claim, and where each of the edges represents a relationship between a corresponding pair of the nodes. In some examples, relationship identifier 725 computes an edge weight for each of the edges, where the edge weight represents a strength of connection between nodes. An example of the graph created by the relationship identifier 725 is described in further detail with reference to FIG. 8.

For example, in an embodiment, the graph is a syntopical multi-graph. The syntopical multi-graph includes one or more edges representing a relationship between a corresponding pair of the nodes. The relationship may include a support relationship, a refute relationship, a contradict relationship, a paraphrase relationship, a topically similar relationship, a relative agreement relationship, or a relative specific relationship.

In some examples, relationship identifier 725 computes a relative stance value for a pair of the nodes, where the graph includes a relative stance edge type and the edge weight for an edge having the relative stance edge type is based on the relative stance value. In some examples, relationship identifier 725 computes a relative specificity value between a pair of the nodes, where the graph includes a relative specificity edge type and the edge weight for an edge having the relative specificity edge type is based on the relative specificity value. In some examples, relationship identifier 725 computes a paraphrase value between a pair of the nodes, where the graph includes a paraphrase edge type and the edge weight for an edge having the paraphrase edge type is based on the paraphrase value. In some examples, relationship identifier 725 computes a natural language inference value between a pair of the nodes, where the graph includes a natural language inference edge type and the edge weight for an edge having the natural language inference edge type is based on the natural language inference value.

According to some embodiments, relationship identifier 725 is configured to create a graph including a set of nodes and a set of edges, where the nodes include the claim, and where each of the edges represents a relationship between a corresponding pair of the nodes. Relationship identifier 725 is an example of, or includes aspects of, the corresponding element described with reference to FIG. 9.

According to some embodiments, stance detection network 730 encodes the claim based on the graph using a graph convolutional network (GCN) to obtain an encoded claim. In some examples, stance detection network 730 classifies the claim by decoding the encoded claim to obtain a stance label that indicates a stance of the claim towards the topic.

According to some embodiments, stance detection network 730 is configured to classify the claim based on the graph to obtain a stance label that indicates a stance of the claim towards the topic, where the stance detection network 730 includes a graph convolutional network (GCN). Stance detection network 730 predicts a stance label for the claim based on the graph. Stance detection network 730 is an example of, or includes aspects of, the corresponding element described with reference to FIG. 9.

According to some embodiments, aspect detection component 735 clusters the nodes based on the graph to obtain an aspect phrase of the topic, where the viewpoint includes the aspect phrase. Aspect detection component 735 is an example of, or includes aspects of, the corresponding element described with reference to FIG. 9.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

FIG. 8 shows an example of a syntopical graph representing context of a set of claims according to aspects of the present disclosure. The example shown includes document 800, topic 805, claim 810, edge 815, and edge type 820.

Document 800 is an example of, or includes aspects of, the corresponding element described with reference to FIG. 3. Document 800 may contain one or more claims 810 (e.g., $C_1$, $C_2$, $C_3$, and $C_4$ are claims extracted from different documents). Topic 805 is given and relevant to content of document 800. For example, topic 805 is nuclear energy. Claim 810 is an example of, or includes aspects of, the corresponding element described with reference to FIGS. 3 and 5.

Embodiments of the present disclosure provide a syntopical graph for a document or set of documents. A syntopical graph is a data structure that represents the context of claims. The syntopical graph is a typed multi-graph (multiple edges exist between nodes), where nodes can be claims or documents, and edges are pairwise relationships such as entailment, paraphrase, topical similarity, or term similarity. The syntopical graph is input to graph neural networks or traditional graph algorithms for encoding the claim to obtain an encoded claim. Users can identify viewpoints in a collection (e.g., a set of documents) using the viewpoint detection network. The viewpoint detection network has increased performance in tasks of aspect and stance detection.

In one embodiment, there are two node types including claim nodes and document nodes. A claim node in a syntopical graph represents a topically relevant claim in a collection of documents. A claim may be treated as a node embedded in a graph. Additionally, graph structures are used to represent the context in which the claim occurs, such as the document the claim appears in or the claim's relationship with other claims.

In one embodiment, two claims from the same source are more likely to represent the same viewpoint than a pair of randomly sampled claims. Claims from the same source share information with each other via document nodes, which enable models to pool information about groups of claims and share the information among them. Similar information about claims can be aggregated in the metadata node and broadcast to all the claims.

In an embodiment, two classes of edge types are claim-claim edges and claim-document edges. Claim-claim edges (($\Sigma_{E:claim}$) model the relationship between pairs of claims. For example, claim-claim edges identify if two claims support each other, one claim is more specific than the other, etc. In some examples, a claim is likely to have a specific stance if other supporting claims have the same stance. Additionally, claim-document edges ($\Sigma_{E:document}$) enable groups of claims to share information with each other through common ancestors. For example, claims in a document in support of nuclear energy are likely to have a pro stance or assigned a pro stance label. A pair of nodes can have multiple edges of different types between the nodes. As a result, a claim from a first document can contradict and refute another claim from a second document. In some examples, a pair of claims from a same document may refute or contradict each other.

In an embodiment, an edge can have a real-valued weight in the range (−1, 1), representing the strength of the connection. For example, the relative stance edge between a claim which strongly refutes another claim is associated with a weight close to −1.

As illustrated in an example in FIG. 8, claims $C_1$ and $C_2$ are extracted from a first document. $C_3$ and $C_4$ are extracted from a second document. Claims $C_1$ and $C_2$ have an entailment relationship. In the syntopical multi-type graph, edge type 820 between claims $C_1$ and $C_2$ shows entailment relationship (i.e., represented by a first line pattern). $C_1$ and $C_3$ have a paraphrase relationship. In the syntopical multi-type graph, edge type 820 between $C_1$ and $C_3$ shows paraphrase relationship (i.e., represented by a second line pattern). In some examples, multiple different edge types exist between a pair of nodes (e.g., two different edge types exist between $C_1$ and $C_4$, three edge types exist between $C_1$ and $C_3$. In some cases, the syntopical graph is also referred to as a typed multi-graph because multiple edge types may exist between a pair of nodes (e.g., claim nodes).

As illustrated in an example in FIG. 8, on the right hand side, tuples are shown involving topic, aspect, and stance. For example, $C_3$ and $C_4$ have a positive stance (pro label) towards aspect $A_1$ of the topic "nuclear energy". $C_1$ has a negative stance (con label) towards aspect $A_1$ of the topic. $C_2$ has a negative stance (con label) towards aspect $A_2$ of the topic. In some examples, $C_1$, $C_3$, and $C_4$ may be grouped together based on the same aspect or aspect term $A_1$ (represented by the dashed line circling these three claims in FIG. 8).

FIG. 9 shows an example of a viewpoint detection diagram according to aspects of the present disclosure. The example shown includes claim extraction network 900, relationship identifier 905, stance detection network 910, aspect detection component 915, viewpoint module 920, synopsis module 925, consensus module 930, coverage module 935, and document identifier 940.

From top to bottom as illustrated in FIG. 9, at least one document and a topic is input to claim extraction network 900. Claim extraction network 900 outputs one or more claims. In some embodiments, a claim is an expression of a viewpoint in natural language, and a single viewpoint can be expressed differently in multiple claims throughout a collection of documents. Aspects are facets of the broader argument around the topic. Here, each claim is assumed to encode one viewpoint. However, in some cases, claims can encode multiple viewpoints simultaneously. The task of viewpoint reconstruction is decomposed into two sub-tasks (i.e., stance detection and aspect detection) along with a grouping of claims with the same aspect and stance. Claim extraction network 900 is an example of, or includes aspects of, the corresponding element described with reference to FIG. 7.

The one or more claims are then input to relationship identifier 905. Relationship identifier 905 generates a graph (e.g., a syntopical graph) based on the claims. The syntopical graph is used to model the salient interactions of the claims from a collection of documents. Additionally, properties of claims (for example, the stance of a claim towards a topic or the aspects the claims can cover) are assessed based on the content of the claim and the entirety of information available in the context of the claim.

In an embodiment, a syntopical graph includes documents and claims as nodes and can capture the context. Edges between claims are constructed using pairwise scoring functions, e.g., pre-trained natural language inference (NLI) models. Claims may relate to each other in many different ways. In some examples, claims may be topically similar, or claims may support, refute, paraphrase, entail or contradict each other, etc. Relationship identifier 905 is an example of, or includes aspects of, the corresponding element described with reference to FIG. 7.

The syntopical graph is then input to stance detection network 910. Stance detection network 910 generates stance information, which indicates a stance of the claim towards the topic. In some examples, stance detection network 910 includes a relational graph convolutional network (R-GCN) to incorporate contextual information. Stance detection network 910 is an example of, or includes aspects of, the corresponding element described with reference to FIG. 7.

In an embodiment, the stance detection network 910 is configured to output a prediction from the set {pro, con}, for each claim node with respect to the topic. R-GCNs perform node classification and edge prediction for knowledge bases, which are also typed multi-graphs.

Aspect detection component 915 generates an aspect phrase based of the graph information. Aspect detection component 915 is an example of, or includes aspects of, the corresponding element described with reference to FIG. 7. In some embodiments of the present disclosure, aspect detection is an unsupervised learning task. For example, a community detection method (i.e., modularity-based community detection) may be used if aspects are an open class. In modularity-based community detection, communities are graph partitions that have more edges within communities than across communities. Modularity is a value assigned to a graph partition, which is higher when there are fewer edges across communities than within the communities. In an example, a modularity of 0 represents a random partition, while higher modularities indicate tighter communities. Modularity-based community detection maximizes modularity by finding dense partitions which performs well for aspects in a syntopical graph. Claims that discuss a similar aspect are likely to have salient interactions.

Stance information and the aspect phrase are input to viewpoint module 920. According to some embodiments, viewpoint module 920 transmits information indicating a viewpoint of the document towards the topic based on the stance label. According to some embodiments, viewpoint module 920 is configured to generate the viewpoint of the document towards the topic, wherein the viewpoint includes the topic, the stance label, and the aspect phrase.

The viewpoint may be input to synopsis module 925 to generate synopsis information. According to some embodiments, synopsis module 925 is configured to generate a synopsis of the document based on the viewpoint. The viewpoint may also be input to consensus module 930 to generate consensus information. According to some embodiments, consensus module 930 is configured to indicate a consensus level of a set of documents including the document towards the topic based on the viewpoint.

The viewpoint may also be input to coverage module 935 to generate coverage information. According to some embodiments, coverage module 935 is configured to indicate a coverage level of a set of documents towards the aspect phrase. The viewpoint may also be input to document identifier 940 to generate a representative document. According to some embodiments, document identifier 940 selects the document as a representative document of the set of documents based on the viewpoint, where the representative document indicates high coverage of an aspect phrase and a balanced viewpoint towards the topic.

Viewpoint Detection

Figure 10:
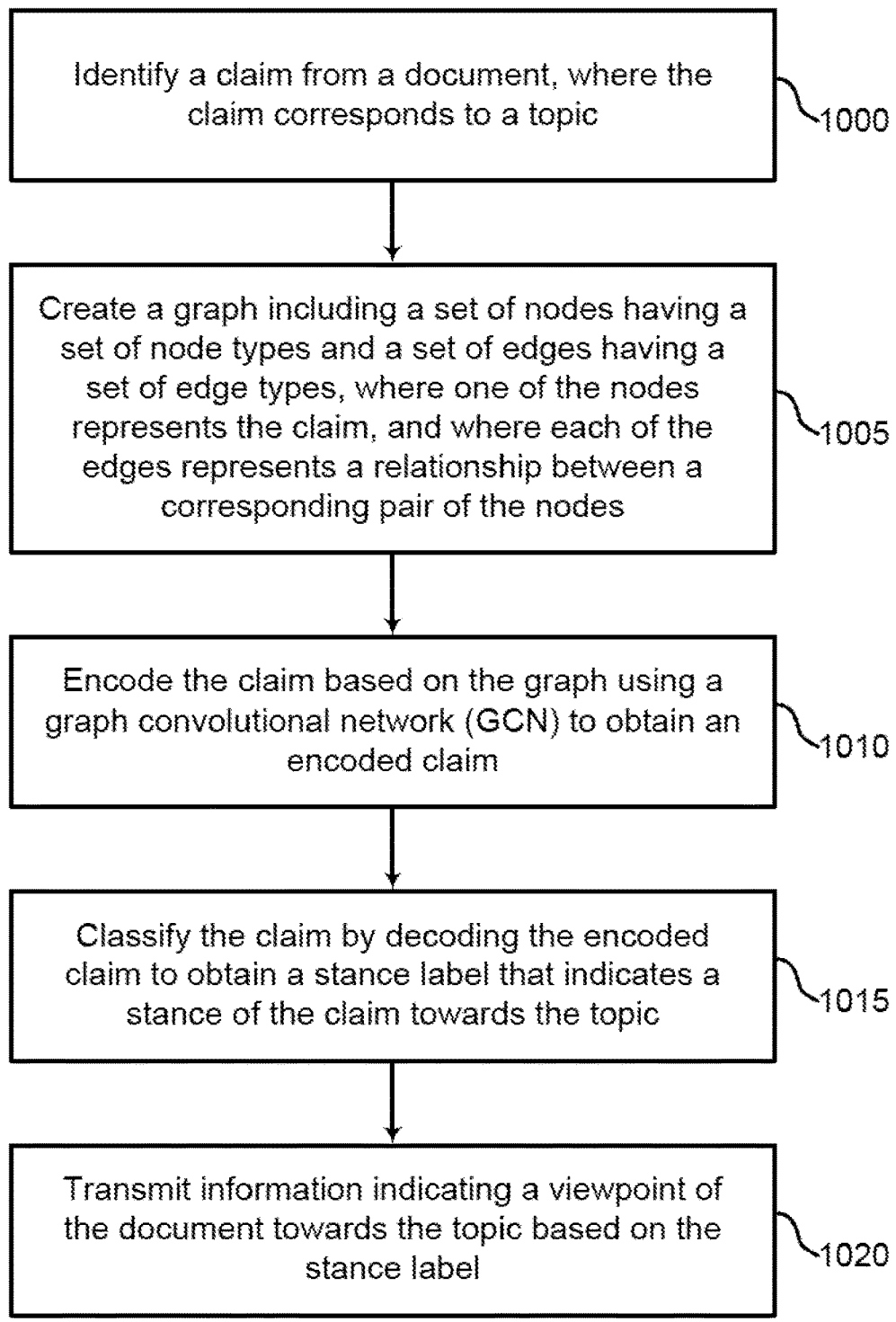
FIG. 10 shows an example of a process for viewpoint detection according to aspects of the present disclosure.

In FIG. 10, A method, apparatus, and non-transitory computer readable medium for natural language processing are described. One or more embodiments of the method, apparatus, and non-transitory computer readable medium include identifying a claim from a document, wherein the claim corresponds to a topic, creating a graph comprising a plurality of nodes having a plurality of node types and a plurality of edges having a plurality of edge types, wherein one of the nodes represents the claim, and wherein each of the edges represents a relationship between a corresponding pair of the nodes, encoding the claim based on the graph using a graph convolutional network (GCN) to obtain an encoded claim, classifying the claim by decoding the encoded claim to obtain a stance label that indicates a stance of the claim towards the topic, and transmitting information indicating a viewpoint of the document towards the topic based on the stance label.

Some examples of the method, apparatus, and non-transitory computer readable medium further include embedding text of the document using a claim extraction network to obtain the claim. Some examples of the method, apparatus, and non-transitory computer readable medium further include clustering the nodes based on the graph to obtain an aspect phrase of the topic, wherein the viewpoint includes the aspect phrase.

Some examples of the method, apparatus, and non-transitory computer readable medium further include extracting a plurality of claims from each of a plurality of documents, wherein the nodes include a node corresponding to each of the plurality of claims. In some examples, the node types include a claim node type and a document node type. In some examples, the edges include an edge between each of the plurality of claims and a corresponding document from the plurality of documents.

Some examples of the method, apparatus, and non-transitory computer readable medium further include computing an edge weight for each of the edges, wherein the edge weight represents a strength of connection between nodes. Some examples of the method, apparatus, and non-transitory computer readable medium further include computing a relative stance value for a pair of the nodes, wherein the graph includes a relative stance edge type and the edge weight for an edge having the relative stance edge type is based on the relative stance value.

Some examples of the method, apparatus, and non-transitory computer readable medium further include computing a relative specificity value between a pair of the nodes, wherein the graph includes a relative specificity edge type and the edge weight for an edge having the relative specificity edge type is based on the relative specificity value. Some examples of the method, apparatus, and non-transitory computer readable medium further include computing a paraphrase value between a pair of the nodes, wherein the graph includes a paraphrase edge type and the edge weight for an edge having the paraphrase edge type is based on the paraphrase value.

Some examples of the method, apparatus, and non-transitory computer readable medium further include computing a natural language inference value between a pair of the nodes, wherein the graph includes a natural language inference edge type and the edge weight for an edge having the natural language inference edge type is based on the natural language inference value. Some examples of the method, apparatus, and non-transitory computer readable medium further include receiving a plurality of documents including the document. Some examples further include selecting the document as a representative document of the plurality of documents based on the viewpoint, wherein the representative document indicates high coverage of an aspect phrase and a balanced viewpoint towards the topic.

FIG. 10 shows an example of a process for viewpoint detection according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1000, the system identifies a claim from a document, where the claim corresponds to a topic. In some cases, the operations of this step refer to, or may be performed by, a claim extraction network as described with reference to FIGS. 7 and 9.

At operation 1005, the system creates a graph including a set of nodes having a set of node types and a set of edges having a set of edge types, where one of the nodes represents the claim, and where each of the edges represents a relationship between a corresponding pair of the nodes. In some cases, the operations of this step refer to, or may be performed by, a relationship identifier as described with reference to FIGS. 7 and 9.

In some embodiments, the system creates a graph where documents and claims are nodes in the graph to capture the context. Edges between claims are constructed using pairwise scoring functions, for example, pre-trained natural language inference (NLI) models. Claims may relate to each other in multiple ways. In some examples, claims may be topically similar or may support, refute, paraphrase, entail or contradict each other, etc. The relationships between claims may be applied to computational argumentation tasks such as stance detection.

In some embodiments, relationship between claims is captured as a typed multi-graph: typed in that the nodes have different types drawn from {document, claim)}, and a multi-graph because multiple edges of different types are allowed between nodes. A syntopical graph is defined as a labeled multi-graph in terms of a 5-tuple G:

$$G=(\Sigma_N, \Sigma_E, N, E, l_N, l_E) \quad (1)$$

where $\Sigma_N$ is the alphabet of node types, $\Sigma_E$ is the alphabet of edge types, N is the set of nodes, E is the set of multi-edges, $l_N$: N→$\Sigma_N$ maps each node to its type, and $l_E$: E→$\Sigma_E$ maps each edge to its type.

The node types, $\Sigma_N$, are used to represent structured metadata in the syntopical graph: $\Sigma_N$={claim, document}, and each node in the syntopical graph is mapped to its type with the function $l_N$. Accordingly, the edge alphabet is defined as:

$$\Sigma_E = \Sigma_{E:claim} \cup \Sigma_{E:document} \quad (2)$$

(where $\Sigma_{E:claim}$ is the set of types of claim-claim edges and $\Sigma_{E:document}$ is the set of types of claim-document edges.

At operation 1010, the system encodes the claim based on the graph using a graph convolutional network (GCN) to obtain an encoded claim. In some cases, the operations of this step refer to, or may be performed by, a stance detection network as described with reference to FIGS. 7 and 9.

One or more embodiments of the present disclosure use a mix of four pre-trained models and two similarity measures for graph edges. The four pre-trained edge types are relative stance and relative specificity, paraphrase edges, and natural language inference edges. The edge weights are confidence scores defined by the following:

$$\text{weight}(u,v,r) = P_{pos(u,v)} - P_{neg(u,v)} \quad (3)$$

where u and v are claims, r is the relation type, and $P_{pos(u,v)}$ is the probability of a positive association between the claims (e.g., "is a paraphrase" or "does entail").

For similarity-based edges, information retrieval-based techniques are used for term-based similarity (e.g., TF-IDF) and topic-based similarity (e.g., LDA) using cosine similarity as the edge weight. The document-claim edges include a single type, contains, with an edge weight of 1. The viewpoint detection apparatus computes each of the pairwise relationships for the pairs of claims that share the same topic, and filter out edges using a threshold τ on the absolute value of the edge weight τ is tuned as a hyperparameter on held-out data for each task.

In an embodiment, the claim node representations are initialized with the output of a natural language inference model for node representations that predicts whether the claim entails the topic. The document representations are initialized with a sentence vectorizer over the text of the document. In some examples, a natural language inference model is a BERT transformer.

In some embodiments, the direction of the interactions between claims (e.g., "support" or "refute") is included in a graph, but in other cases a direction is not used. A transformation is applied to collapse the multi-edges of a syntopical graph (denoted as SG herein) to a positive-weighted graph (G) to capture the intensity of the interaction between a pair of claims:

$$w_G(u, v) = \frac{\Sigma_{t \in \Sigma_E} \delta_{SG}(u, v, t) \cdot |w_{SG}(u, v, t)|}{\Sigma_{t \in \Sigma_E} \delta_{SG}(u, v, t)} \quad (4)$$

where $w_G(u,v)$ is the weight between nodes u and v in the new graph G, $\delta_{SG}(u,v,t)=1$ if an edge of type t exists between nodes u and v in the syntopical graph (SG), and $w_{SG}(u,v,t)$ is the edge weight for type t between nodes u and v in the syntopical graph. This is equivalent to taking the average across types of the absolute value of the weights. The newly constructed single-edge graph is then used to identify aspects that may have more interactions between them than across them.

At operation 1015, the system classifies the claim by decoding the encoded claim to obtain a stance label that indicates a stance of the claim towards the topic (e.g., using a feed forward neural network). In some cases, the operations of this step refer to, or may be performed by, a stance detection network as described with reference to FIGS. 7 and 9.

In some embodiments, the stance detection network is configured to assign a valence label to a claim with respect to a particular topic. In some examples, pre-assigning a stance may not be possible in the claim "nuclear power plants take 5 years to construct" (i.e., assign a stance a priori). Alternatively, in the context of other claim such as "solar farms often take less than 2 years to commission", it may be viewed as having a negative stance. In some examples, syntopical graphs discussed above are input to a graph neural network (e.g., relational graph convolutional network or R-GCN) to incorporate contextual information.

One or more embodiments of the present disclosure treat stance detection as a supervised node classification task. The stance detection network is configured to output a prediction from the set {pro, con}, for each claim node with respect to a given topic. R-GCNs perform node classification and edge prediction for knowledge bases, which are also typed multi-graphs. The abstractions of the syntopical graph slot neatly into the abstractions of R-GCNs.

In some embodiments, input to an R-GCN includes a weighted, typed multi-graph with some initial node representation. The stance detection network includes stacked relational graph convolutional layers, each layer computes a new set of node representations based on each node's neighborhood. Each layer combines the edge-type-specific representation of all of a node's neighbors with its own representation. The representations are influenced by the node, and the neighbors of the node, attenuated through the edge weight. Therefore, an R-GCN consumes a set of initial claim representations, transforms the claim representations through stacks of relational graph convolutional layers, and outputs a final set of node vectors, which are then fed into a classifier to predict the claim stance.

At operation 1020, the system transmits information indicating a viewpoint of the document towards the topic based on the stance label. In some cases, the operations of this step refer to, or may be performed by, a viewpoint module as described with reference to FIG. 9.

A collection of documents includes claims or conclusions that can be grouped by aspects of a topic discussed and by the stance they convey towards the topic. A user obtains a thorough understanding of the topic relying on overview of the viewpoints expressed in a document or a set of documents and the associated interactions. In some embodiments, the system can reconstruct viewpoints within a collection of documents. The argumentative unit of a claim is considered the minimal expression of a viewpoint in natural language, such that a single viewpoint can be expressed through multiple claims.

In some cases, a viewpoint can be a judgment of an aspect of a topic that conveys a stance towards the topic. Viewpoint reconstruction identifies the set of viewpoints in a collection given a topic, starting with the claims. In an example, a viewpoint is expressed as a triple V:

$$V = (\text{topic}, \text{aspect}, \text{stance}) \quad (5)$$

The system is configured to identify, group, and summarize the latent viewpoints underlying the claims in a collection, such that a user (e.g., reader, researcher) can investigate and engage with the viewpoints. In an example, consider two claims, "Nuclear energy emits zero $CO_2$" and "Nuclear can provide a clean baseload, eliminating the need for fracking and coal mining". Within a collection of documents, the two claims express V=(nuclear energy, environmental impact, pro). That is, the two claims express a positive attitude (pro stance label) towards the aspect of the topic (i.e., environmental impact of nuclear energy).

Training and Evaluation

Figure 11:
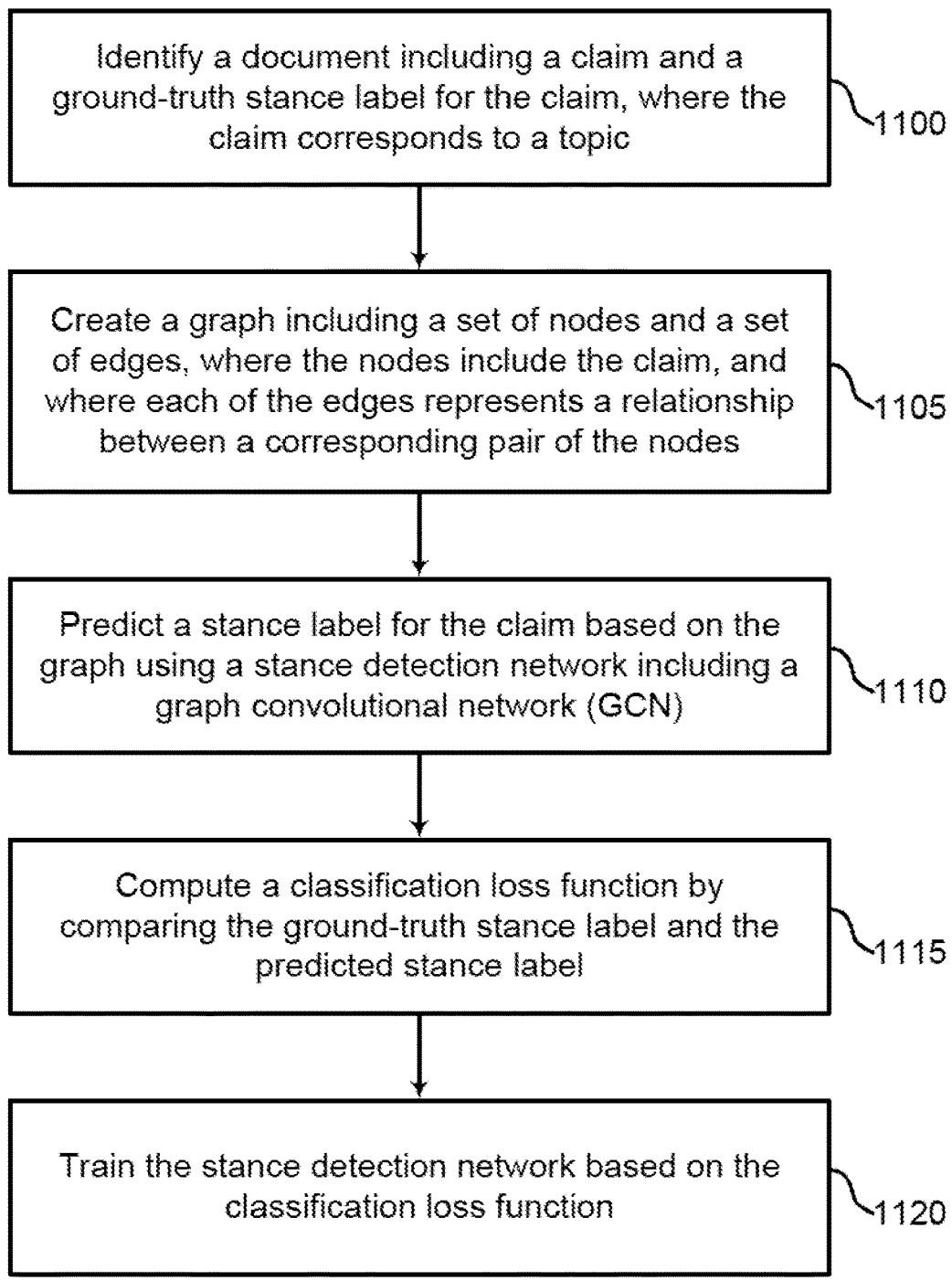
FIG. 11 shows an example of a process for training a stance detection network according to aspects of the present disclosure.

In FIG. 11, a method, apparatus, and non-transitory computer readable medium for training a network are described. One or more embodiments of the method, apparatus, and non-transitory computer readable medium include identifying a document comprising a claim and a ground-truth stance label for the claim, wherein the claim corresponds to a topic, creating a graph comprising a plurality of nodes and a plurality of edges, wherein the nodes include the claim, and wherein each of the edges represents a relationship between a corresponding pair of the nodes, predicting a stance label for the claim based on the graph using a stance detection network comprising a graph convolutional network (GCN), computing a classification loss function by comparing the ground-truth stance label and the predicted stance label, and training the stance detection network based on the classification loss function.

Some examples of the method, apparatus, and non-transitory computer readable medium further include clustering the nodes based on the graph to obtain an aspect phrase of the topic.

FIG. 11 shows an example of a process for training a stance detection network according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

One or more embodiments of the present disclosure use supervised training techniques. Supervised learning is one of three basic machine learning paradigms, alongside unsupervised learning and reinforcement learning. Supervised learning is a machine learning technique based on learning a function that maps an input to an output based on example input-output pairs. Supervised learning generates a function for predicting labeled data based on labeled training data consisting of a set of training examples. In some cases, each example is a pair having an input object (e.g., a vector) and a desired output value (e.g., a single value, or an output vector). A supervised learning algorithm analyzes the training data and produces the inferred function, which can be used for mapping new examples. In some cases, the learning results in a function that correctly determines the class labels for unseen instances. In other words, the learning algorithm generalizes from the training data to unseen examples.

Accordingly, during the training process, the parameters and weights of a viewpoint detection network are adjusted to increase the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

At operation 1100, the system identifies a document including a claim and a ground-truth stance label for the claim, where the claim corresponds to a topic. The ground-truth stance label includes a pro label or a con label. In some cases, the operations of this step refer to, or may be performed by, a training component as described with reference to FIG. 7.

In some examples, a heterogeneous cross-topic argumentation mining dataset (ArgMin) and a claim-stance dataset by IBM® (IBMCS) are used for stance detection experiments and training. The ArgMin dataset contains approximately 25 k sentences from 400 documents across eight topics, for example, abortion, school uniforms, etc. The claims in the dataset are filtered, resulting in 11.1 k claims. The IBMCS dataset contains 2.4 k claims across 55 topics. Splitting the dataset ensures that the topics in the training set and test set are mutually exclusive. Claims are given a stance label drawn from {pro, con} and evaluated using macro-averaged $F_1$ and accuracy indices.

At operation 1105, the system creates a graph including a set of nodes and a set of edges, where the nodes include the claim, and where each of the edges represents a relationship between a corresponding pair of the nodes. In some cases, the operations of this step refer to, or may be performed by, a relationship identifier as described with reference to FIGS. 7 and 9. In an embodiment, the system creates a syntopical graph, which makes use of claim content and incorporates context.

According to some embodiments, a syntopical graph is a data structure that represents the context of claims. The syntopical graph is a typed multi-graph (multiple edges allowed between nodes), where nodes can be claims type or documents type, and edges are pairwise relationships between a pair of nodes such as entailment, paraphrase, topical similarity, or term similarity relationship. The syntopical graph is then input to graph neural networks, and the system can perform aspect and stance detection based on the graph. The system further identifies viewpoints in a document or collection of documents. In some cases, a viewpoint may be understood as a judgment of some aspect of a topic that conveys a stance towards a topic.

At operation 1110, the system predicts a stance label for the claim based on the graph using a stance detection network including a graph convolutional network (GCN). In some cases, the operations of this step refer to, or may be performed by, a stance detection network as described with reference to FIGS. 7 and 9.

In an embodiment, a syntopical graph for each dataset is input to a relational graph convolutional network (R-GCN), implemented in machine learning library such as deep graph library (DGL) and PyTorch. A pre-trained sentence transformer is used, and the sentences are concatenated as input for document node representations. In some examples, a robustly optimized BERT model (RoBERTa model), which is pre-trained on textual entailment (i.e., natural language interface) tasks, is configured to encode both the claim and topic for claim node representations. The resulting vectors are fixed throughout training.

At operation 1115, the system computes a classification loss function by comparing the ground-truth stance label and the predicted stance label. In some cases, the operations of this step refer to, or may be performed by, a training component as described with reference to FIG. 7.

In some examples, a supervised training model includes a loss function that compares predictions of the viewpoint detection network with ground truth training data. The term loss function refers to a function that impacts how a machine learning model is trained in a supervised learning model. Specifically, during each training iteration, the output of the model is compared to the known annotation information in the training data. The loss function provides a value for how close the predicted annotation data is to the actual annotation data. After computing the loss function, the parameters of the model are updated accordingly, and a new set of predictions are made during the next iteration.

At operation 1120, the system trains the stance detection network based on the classification loss function. In some cases, the operations of this step refer to, or may be performed by, a training component as described with reference to FIG. 7.

Performance of apparatus, systems and methods of the present disclosure have been evaluated, and results indicate embodiments of the present disclosure have obtained increased performance over existing technology. Example experiments demonstrate that the viewpoint detection network outperforms conventional systems.

One or more embodiments of the present disclosure consider three datasets across subtasks of stance and aspect detection to evaluate the effectiveness of using syntopical graphs for reconstructing viewpoints. Syntopical graphs make use of claim content and context. As a result, syntopical graph based methods outperform content-only baselines.

The syntopical graph-based model is evaluated by conducting experiments, which include removing the use of document nodes or initial claim representations, analyzing the performance of each edge type in isolation and when left out, and an analysis of the differences in predictions between the syntopical graph and content-only baselines.

As for aspect detection, the argument frames dataset is used for clustering-based aspect detection. The dataset contains approximately 11 k sentences from 465 different topics. Each sentence has a specific aspect (or frame), from a set of more than one thousand possible aspects. A clustering metric, bcubed $F_1$ is evaluated and the syntopical graph is an input to modularity-based community detection, using σ of 0.6 tuned on held-out topics.

One or more embodiments of the present disclosure can fuse signals from content and structure through syntopical graphs (e.g., syntopical graphs are input to R-GCN) which outperforms existing methods for the IBMCS dataset (83.40 macro $F_1$, +5.68 absolute) and the ArgMin dataset (67.7 macro $F_1$, +6.12 absolute). The complementarity of content-oriented RoBERTa Large NLI model and the structure-only syntopical graph results in increased performance. The viewpoint detection network (i.e., including claim nodes and document nodes) outperforms baseline techniques.

One or more embodiments of the present disclosure use a modularity method which outperforms existing techniques on the argument frames dataset (55.42 b-cubed $F_1$, +8.41 absolute) for aspect detection. The robustness of using syntopical graph in stance and aspect detection is demonstrated through analyzing the contribution of each edge type, running experiments without and with only each edge type.

In some examples, an ablation study has been performed to analyze each edge type (i.e., edge analysis) by building graphs containing each edge independently, and graphs dropping each edge independently.

The IBMCS dataset is used for the supervised task of stance detection. The combination of edges outperforms single edge (i.e., relative stance with a macro-$F_1$ score of 80.72) indicating that the syntopical graph-based model can make use of the different types of relationships represented by the edge types. Removal of relative stance (79.39), relative specificity (79.39), or NLI (78.95) edges results in decreased performance, indicating the unique information captured by the edges. Additionally, paraphrase edge can be removed without loss for stance detection.

By contrast, paraphrase edge contains enough information to account for more than 100% of the improvements (macro $F_1$ score of 56.31) in aspect detection, which is an unsupervised community detection task. Relative stance, relative specificity or NLI edges have a slight negative effect on the overall results (macro $F_1$ score of 55.42).

A confounder of the contribution of each edge type is the out-of-domain performance of the pairwise model used to predict that edge. A less sophisticated model leads to random noise, even if the edge type is helpful. To investigate the results of a less sophisticated model, 100 of each of the edges (above τ=0.6) are sampled with the highest weight, the lowest weight, and a random sample. Each edge is annotated as being correctly or incorrectly predicted.

Edge weight is correlated with edge correctness, which implies that the models retain some level of calibration across domains. The incorporation of edge weight in the R-GCN reduces the effect of noisier, weaker edges. An edge type's usefulness across tasks is not a function of that edge type's accuracy. The type of failure mode, for example the relative stance edges have low surface-level accuracy. One example failure is about predicting any stance for pairs of claims about different aspects.

One or more embodiments of the present disclosure analyze flipped cases in stance detection where the baseline predicted stance correctly, but the model predicted stance incorrectly or vice-versa. Evaluation and experiments include analyzing the difference between the predictions of syntopical graph-based method and predictions from the content-only MT-DNN baseline. There are 1,355 claims in the test set for the IBMCS dataset, 219 (16.2%) are flipped correctly and 140 (10.3%) are flipped incorrectly relative to the MT-DNN baseline. Thus, 26.5% of the overall predictions are flipped for the 5.68-point improvement in $F_1$. Similarly, for ArgMin dataset, 536 (19.6%) claims are flipped correctly. 373 (13.7%) claims are flipped incorrectly out of a total 2726 claims in the test set.

In some embodiments, syntopical graph provides context for claims in collections (e.g., a set of documents). Empirical studies show that syntopical graphs can be used as input representations for graph-structured techniques (e.g., graph neural networks and graph clustering algorithms).

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for natural language processing, comprising:
   identifying a first claim and a second claim from a document, wherein the first claim and the second claim correspond to a topic;
   identifying a syntopical relationship between the first claim and the second claim, wherein the syntopical relationship indicates whether the second claim supports or refutes the first claim;
   creating a graph comprising a plurality of nodes and a plurality of edges, wherein a first node of the plurality of nodes represents the first claim, a second node of the plurality of nodes represents the second claim, and wherein an edge of the plurality of edges represents the syntopical relationship;

performing a graph convolution on the graph using a graph convolutional network (GCN) of a stance detection network to obtain an encoded claim comprising a vector that encodes the first claim and the syntopical relationship, wherein the stance detection network is trained to predict a stance label using ground-truth stance information;

clustering the plurality of nodes based on the graph to obtain an aspect phrase of the topic; and generating, using the stance detection network, viewpoint information of the document towards the topic by decoding the encoded claim to obtain the stance label that indicates a stance of the first claim towards the topic, wherein the viewpoint information includes the aspect phrase.

2. The method of claim 1, further comprising:
embedding text of the document using a claim extraction network to obtain the first claim.

3. The method of claim 1, further comprising:
extracting a plurality of claims from each of a plurality of documents, wherein the nodes include a node corresponding to each of the plurality of claims.

4. The method of claim 3, wherein:
the plurality of nodes has a plurality of node types including a claim node type and a document node type; and
the edges include an edge between each of the plurality of claims and a corresponding document from the plurality of documents.

5. The method of claim 1, further comprising:
computing an edge weight for each of the plurality of edges, wherein the edge weight represents a strength of connection between a pair of nodes from the plurality of nodes.

6. The method of claim 5, further comprising:
computing a relative stance value for the pair of nodes, wherein the graph includes a relative stance edge type and the edge weight for an edge having the relative stance edge type is based on the relative stance value.

7. The method of claim 5, further comprising:
computing a relative specificity value between the pair of nodes, wherein the graph includes a relative specificity edge type and the edge weight for an edge having the relative specificity edge type is based on the relative specificity value.

8. The method of claim 5, further comprising:
computing a paraphrase value between the pair of nodes, wherein the graph includes a paraphrase edge type and the edge weight for an edge having the paraphrase edge type is based on the paraphrase value.

9. The method of claim 5, further comprising:
computing a natural language inference value between the pair of nodes, wherein the graph includes a natural language inference edge type and the edge weight for an edge having the natural language inference edge type is based on the natural language inference value.

10. The method of claim 1, further comprising:
receiving a plurality of documents including the document; and
selecting the document as a representative document of the plurality of documents based on the viewpoint information, wherein the representative document indicates high coverage of the aspect phrase and a balanced viewpoint towards the topic.

11. An apparatus for natural language processing, comprising:
at least one processor;
at least one memory including instructions executable by the at least one processor;
a claim extraction network configured to identify a first claim and a second claim from a document, wherein the first claim and the second claim correspond to a topic;
a relationship identifier configured to identify a syntopical relationship between the first claim and the second claim, wherein the syntopical relationship indicates whether the second claim supports or refutes the first claim, and create a graph comprising a plurality of nodes and a plurality of edges, wherein a first node of the plurality of nodes represents the first claim, a second node of the plurality of nodes represents the second claim, and wherein an edge of the plurality of edges represents the syntopical relationship;
a stance detection network configured to performing a graph convolution on the graph using a graph convolutional network (GCN) to obtain an encoded claim comprising a vector that encodes the first claim and the syntopical relationship, wherein the stance detection network is trained to predict a stance label using ground-truth stance information, and generate viewpoint information of the document towards the topic by decoding the encoded claim to obtain the stance label that indicates a stance of the first claim towards the topic; and
an aspect detection component configured to cluster the plurality of nodes based on the graph to obtain an aspect phrase of the topic, wherein a viewpoint includes the aspect phrase.

12. The apparatus of claim 11, further comprising:
a viewpoint module configured to generate the viewpoint of the document towards the topic, wherein the viewpoint includes the topic, the stance label, and the aspect phrase.

13. The apparatus of claim 11, further comprising:
a synopsis module configured to generate a synopsis of the document based on the viewpoint.

14. The apparatus of claim 11, further comprising:
a consensus module configured to indicate a consensus level of a plurality of documents including the document towards the topic based on the viewpoint.

15. The apparatus of claim 11, further comprising:
a coverage module configured to indicate a coverage level of a plurality of documents towards the aspect phrase.

16. The apparatus of claim 11, further comprising:
a document identifier configured to select the document as a representative document of a plurality of documents based on the viewpoint.

17. The apparatus of claim 11, further comprising:
a user interface configured to display information indicating the viewpoint, a synopsis, a consensus level, a coverage level, or any combination thereof.

18. A method for training a network, comprising:
identifying a document comprising a first claim and a second claim and a ground-truth stance label for the first claim, wherein the first claim and the second claim correspond to a topic;
identifying a syntopical relationship between the first claim and the second claim, wherein the syntopical relationship indicates whether the second claim supports or refutes the first claim;

creating a graph comprising a plurality of nodes and a plurality of edges, wherein a first node of the plurality of nodes represents the first claim, a second node of the plurality of nodes represents the second claim, and wherein an edge of the plurality of edges represents the syntopical relationship;

performing a graph convolution on the graph using a graph convolutional network (GCN) of a stance detection network to obtain an encoded claim comprising a vector that encodes the first claim and the syntopical relationship;

predicting a stance label for the first claim based on the graph using the stance detection network;

computing a classification loss function by comparing the ground-truth stance label and the predicted stance label;

training the stance detection network based on the classification loss function;

clustering the plurality of nodes based on the graph to obtain an aspect phrase of the topic; and generating, using the stance detection network, viewpoint information of the document towards the topic.

* * * * *